(12) United States Patent
McCallister

(10) Patent No.: US 7,295,816 B2
(45) Date of Patent: Nov. 13, 2007

(54) METHODS AND APPARATUS FOR CONTROLLING SIGNALS

(75) Inventor: Ronald D. McCallister, Scottsdale, AZ (US)

(73) Assignee: Crestcom, Inc., Scottsdale, AZ (US)

( * ) Notice: Subject to any disclaimer, the term of this patent is extended or adjusted under 35 U.S.C. 154(b) by 756 days.

(21) Appl. No.: 10/732,390

(22) Filed: Dec. 9, 2003

(65) Prior Publication Data

US 2004/0266369 A1 Dec. 30, 2004

Related U.S. Application Data

(63) Continuation-in-part of application No. 10/611,793, filed on Jun. 30, 2003.

(51) Int. Cl.
*H04B 1/04* (2006.01)
*H04B 1/18* (2006.01)

(52) U.S. Cl. ............... 455/114.2; 455/114.3; 455/296

(58) Field of Classification Search ............ 455/115.1, 455/522; 375/322, 297
See application file for complete search history.

(56) References Cited

U.S. PATENT DOCUMENTS

| | | | |
|---|---|---|---|
| 4,298,871 A | 11/1981 | Kennedy et al. | |
| 5,519,530 A | 5/1996 | Utsumi | |
| 5,646,631 A | 7/1997 | Arntz | |
| 6,104,761 A | 8/2000 | McCallister | |
| 6,236,864 B1 | 5/2001 | McGowan | |
| 6,356,606 B1 | 3/2002 | Hahm | |
| 6,366,619 B1 | 4/2002 | McCallister | |
| 6,519,244 B1 | 2/2003 | Unno | |
| 6,687,511 B2 | 2/2004 | McGowan et al. | |
| 6,741,661 B2 | 5/2004 | Wheatley et al. | |
| 6,845,082 B2 | 1/2005 | Bourget et al. | |
| 2002/0191705 A1 | 12/2002 | Melsa | |
| 2003/0043895 A1 | 3/2003 | Melsa | |
| 2003/0053562 A1* | 3/2003 | Busson et al. | ............... 375/322 |
| 2003/0063682 A1 | 4/2003 | Shearer, III | |
| 2003/0063683 A1 | 4/2003 | MacFarlane | |

(Continued)

OTHER PUBLICATIONS

Buswell et al., Design of Low Cost, High Performance RF Front-ends for . . . , The Communications Edge.

(Continued)

*Primary Examiner*—Nay Maung
*Assistant Examiner*—Richard Chan
(74) *Attorney, Agent, or Firm*—Morgan & Finnegan, L.L.P.

(57) ABSTRACT

A communication and/or amplifier system according to various aspects of the present invention includes an excursion signal generator and a filter system. The excursion signal generator identifies a peak portion of a signal that exceeds a threshold, such as a magnitude threshold. The filter system filters a corresponding excursion signal having a magnitude and waveform corresponding to the portion exceeding the threshold to remove unwanted frequency components from a delayed version of the excursion signal. The filtered excursion signal may then be subtracted from the original signal to reduce the peak. In one embodiment, the communication and/or amplifier system operates in conjunction with signals having multiple channels and subchannels. The system may include a magnitude adjustment system configured to adjust magnitudes of the excursion signal subchannels according to magnitudes of the first signal subchannels. The system may also adjust the excursion signal magnitude in a time division environment according to the magnitude of the original signal in the same time slot.

127 Claims, 18 Drawing Sheets

U.S. PATENT DOCUMENTS

2003/0086507 A1* 5/2003 Kim et al. .................. 375/297
2004/0008795 A1 1/2004 Chu et al.
2004/0100210 A1 5/2004 Hori et al.
2005/0163248 A1 7/2005 Berangi et al.

OTHER PUBLICATIONS

Staudinger, Issues and Trends in Mobile Cellular Transmitter Power Amplification, Motorola.

* cited by examiner

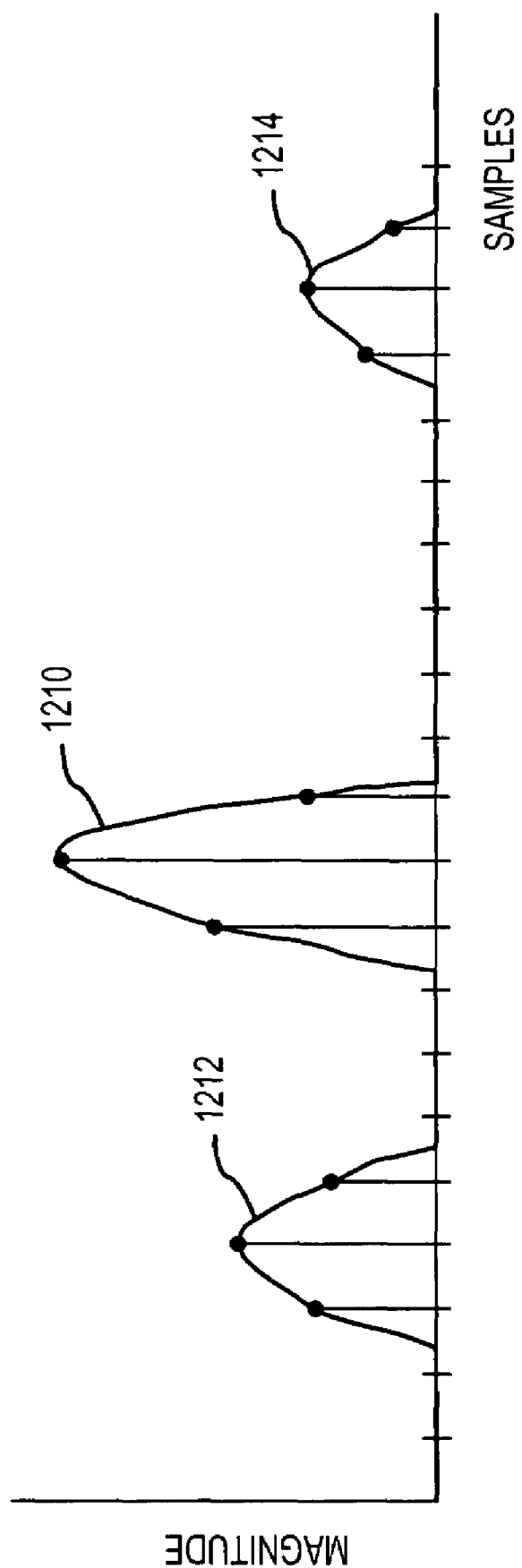

METHODS AND APPARATUS FOR CONTROLLING SIGNALS

CROSS-REFERENCES TO RELATED APPLICATIONS

This application is a continuation-in-part of U.S. patent application Ser. No. 10/611,793, filed Jun. 30, 2003, and incorporates the disclosure of the application by reference.

FIELD OF THE INVENTION

The invention relates to methods and apparatus for communications and signal processing.

BACKGROUND OF THE INVENTION

Wireless communication base stations, networks, and other systems use power amplifiers, such as to transmit signals to cellular phones, computers, personal electronic assistants, and other devices. A power amplifier increases the average power of the transmitted wireless signal sufficiently to maintain a reliable communication link at any required distance. The transmitted signal's power varies, depending on both the modulation type and the data sequence being transmitted, resulting in the signal exhibiting random peaks and troughs over time in its instantaneous power. The complexity and cost of an amplifier is highly dependent on the maximum instantaneous power that it must accommodate. Consequently, base station providers and other electronics users seek ways to lower the instantaneous or "peak"-power requirements of the relevant system.

To reduce system peak-power requirements, a provider may simply limit the maximum amplifier output power by constraining or "clipping" the maximum magnitude of its output signal. Clipping the amplifier output effectively reduces the peak-power output requirement while still providing ordinary amplification for non-peak signals. Since the cost of a power amplifier rapidly increases as it is required to accommodate higher peak-power levels, clipping can significantly reduce system cost.

Clipping may be particularly attractive in applications in which occasional large peaks occur. For example, in wireless communications, a single amplifier often simultaneously amplifies signals for multiple channels. Occasionally, the multiple signals constructively combine to generate a relatively high peak. The amplifier must either fully amplify the peak, requiring an expensive high peak-power amplifier, or the output magnitude may be clipped to facilitate the use of a lower peak-power, less expensive amplifier.

In wireless communications and networking, however, clipping is unacceptable. Clipping induces spectral regrowth, creating spectral energy in potentially restricted spectral regions. The electromagnetic spectrum is a finite resource, and it is strictly apportioned by restrictions from various regulation agencies to minimize interference from competing users. The various spectrum users receive permission to transmit within certain bandwidths and are ordinarily prohibited from transmitting outside of the designated bandwidth. Even within the so-called "unlicensed bands", strict FCC standards regulate spectral emissions to minimize interferences. Because spectral regrowth adds unacceptable frequency components to the signal, spectrum regulations do not permit clipping as a solution for high power amplifier requirements.

SUMMARY OF THE INVENTION

A communication and/or amplifier system according to various aspects of the present invention includes an excursion signal generator and a filter system. The excursion signal generator identifies a peak portion of a signal that exceeds a threshold, such as a magnitude threshold. The filter system filters a corresponding excursion signal having a magnitude and waveform corresponding to the portion exceeding the threshold to remove unwanted frequency components from a delayed version of the excursion signal. The filtered excursion signal may then be subtracted from the original signal to reduce the peak. In one embodiment, the communication and/or amplifier system operates in conjunction with signals having multiple channels and subchannels. The system may include a magnitude adjustment system configured to adjust magnitudes of the excursion signal subchannels according to magnitudes of the first signal subchannels. The system may also adjust the excursion signal magnitude in a time division environment according to the magnitude of the original signal in the same time slot.

BRIEF DESCRIPTION OF THE DRAWING FIGURES

A more complete understanding of the present invention may be derived by referring to the detailed description when considered in connection with the following illustrative figures. In the following figures, like reference numbers refer to similar elements and steps.

Figure 7A:
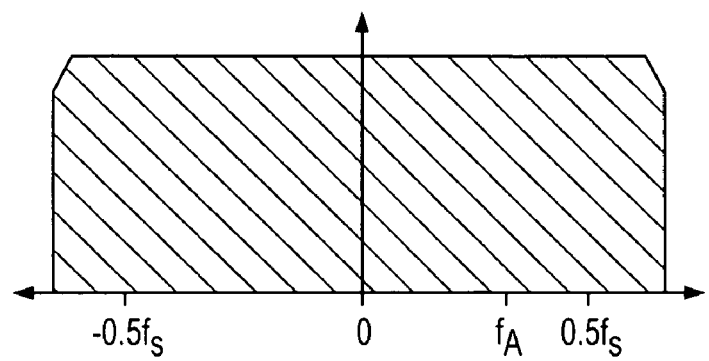
Figure 7B:
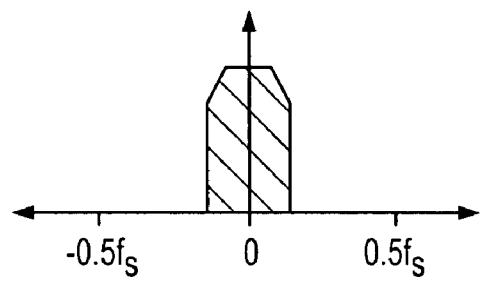
Figure 7C:
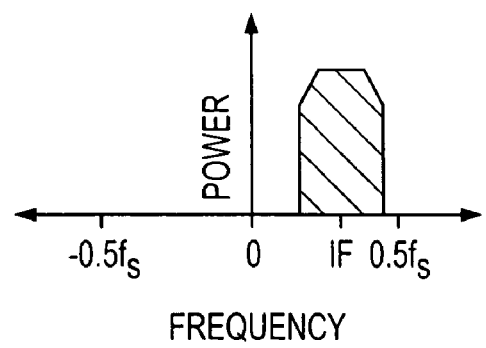
Figure 8:
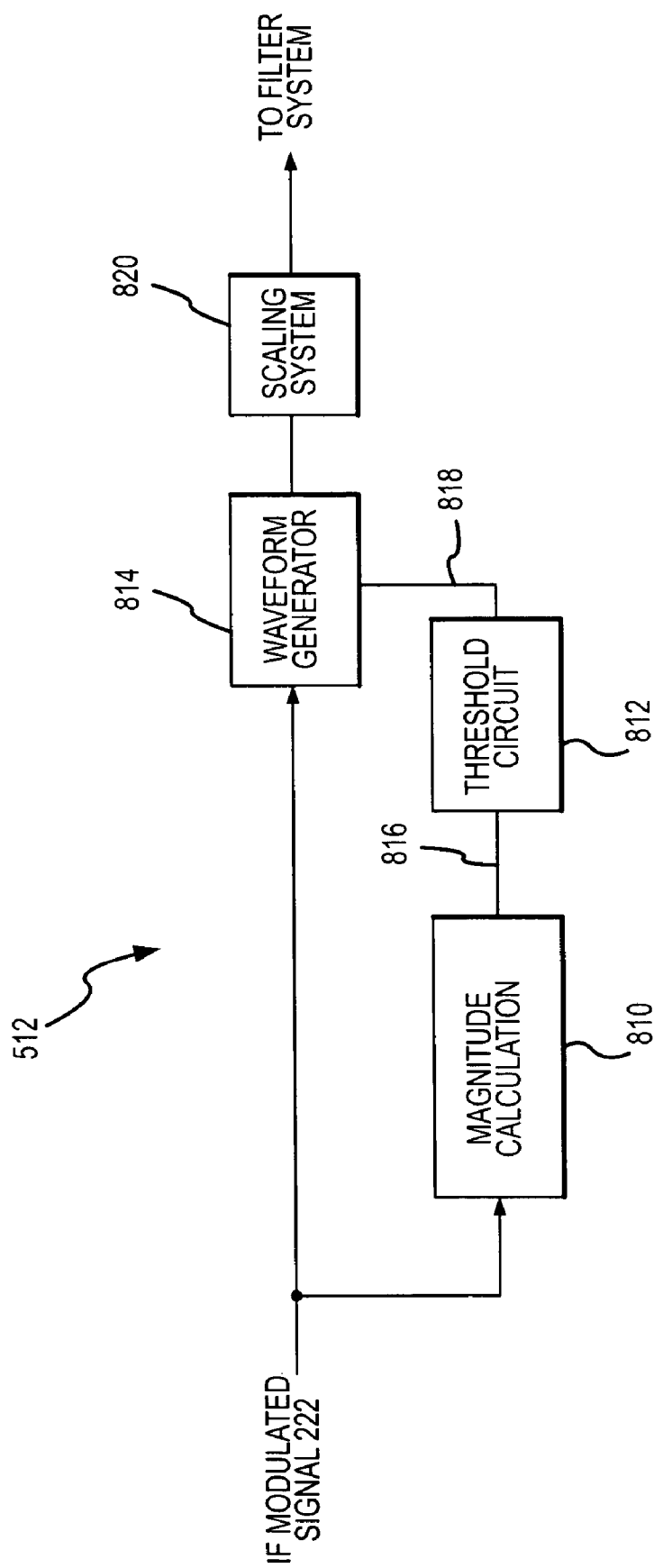
Figure 9:
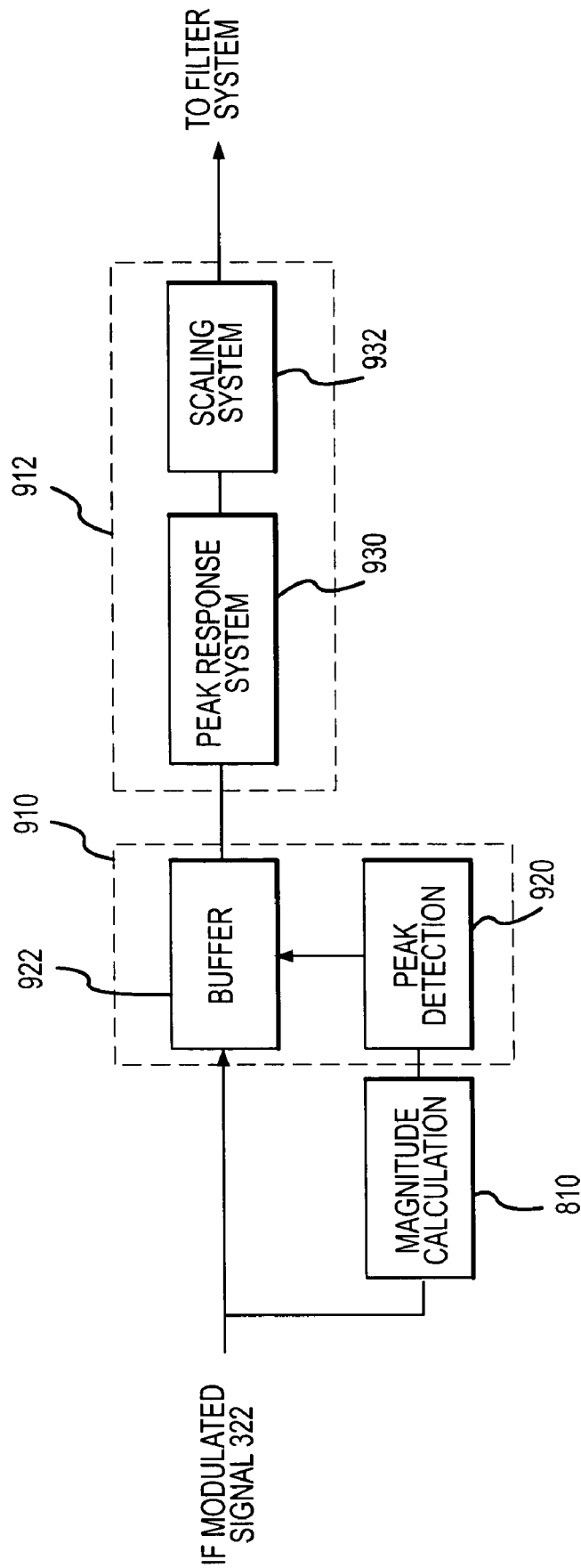
Figure 10:
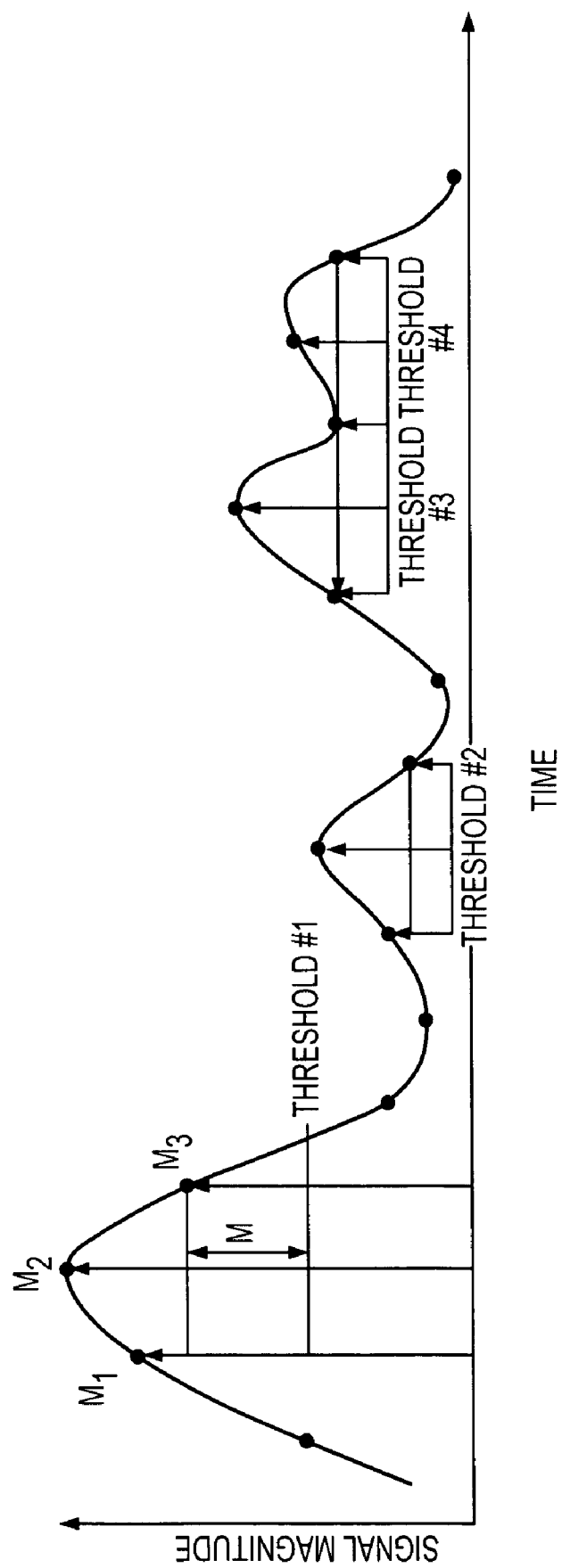
Figure 11B:
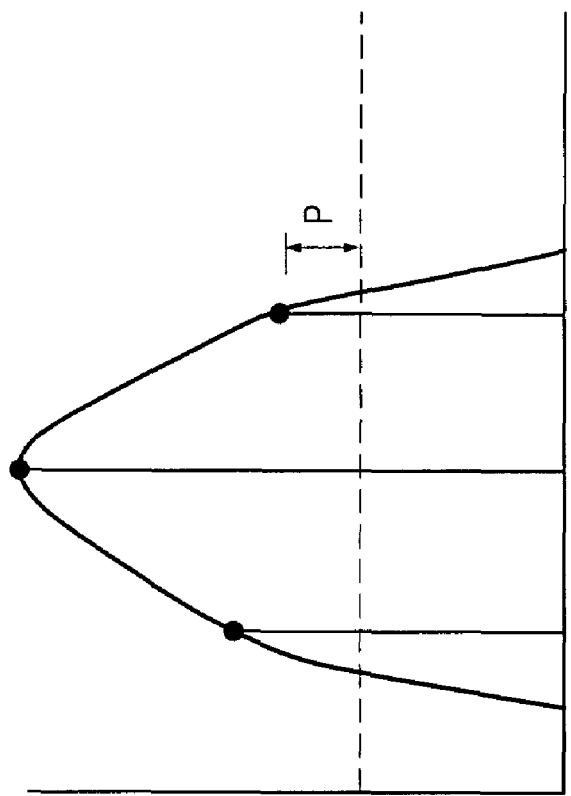
Figure 11A:
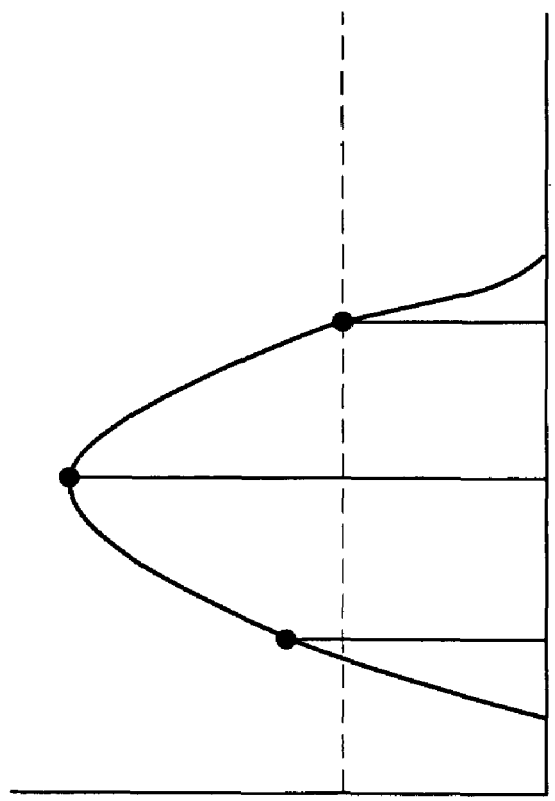
Figure 13:
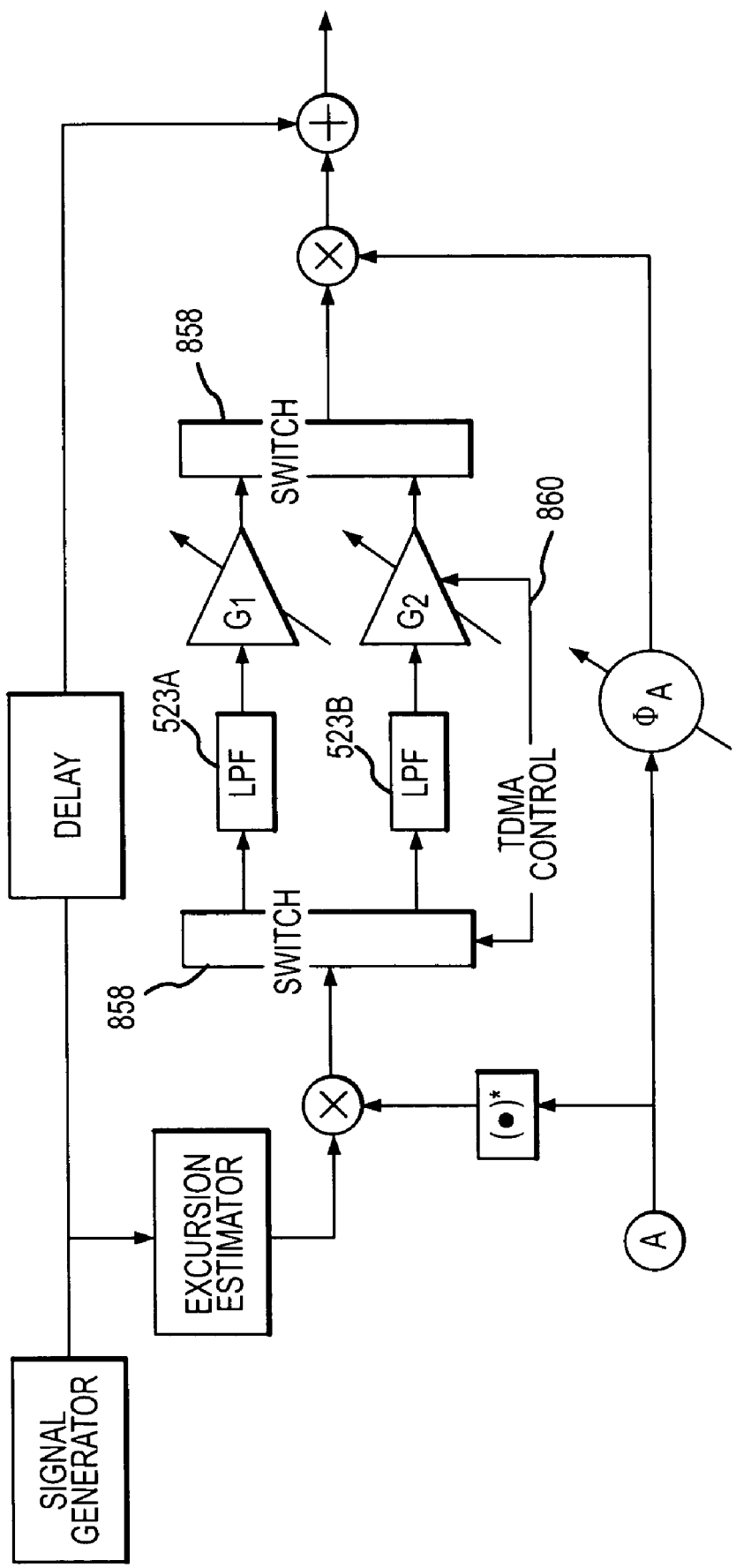
Figure 14:
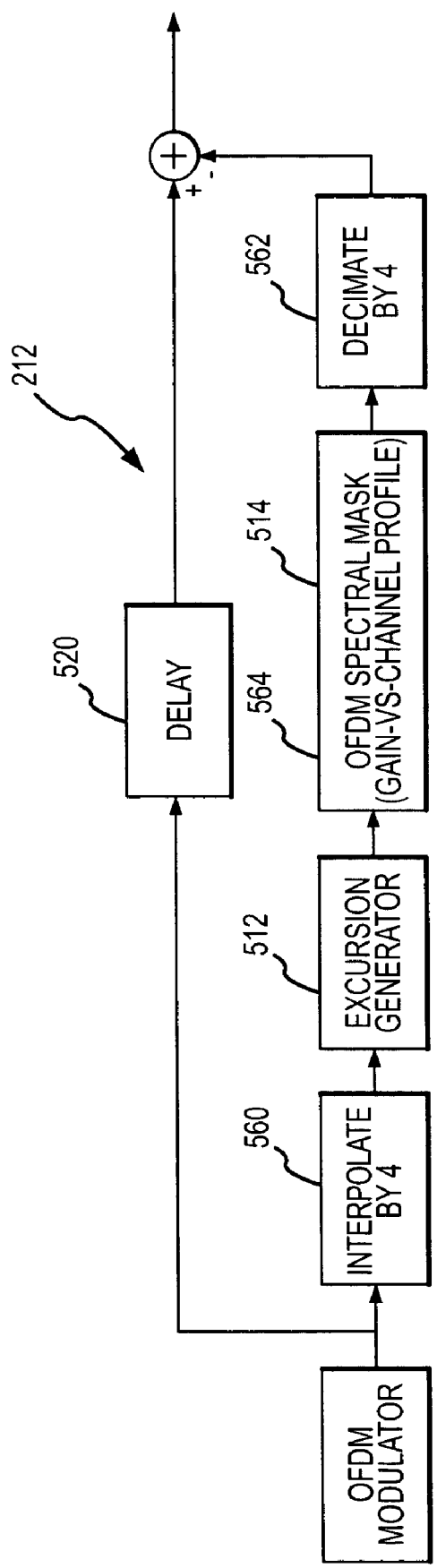
Figure 15:
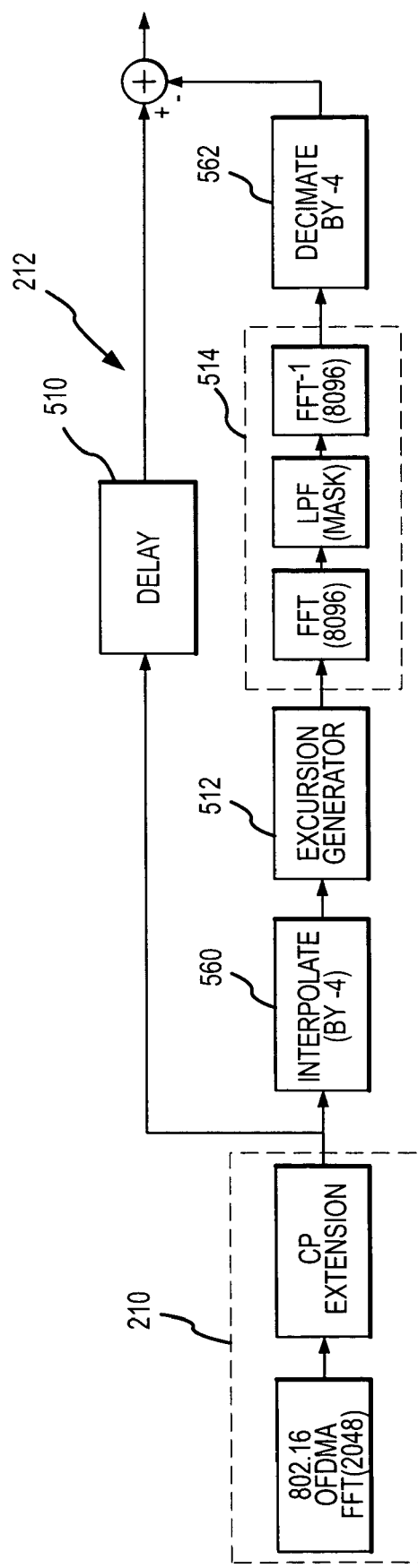
Figure 16:
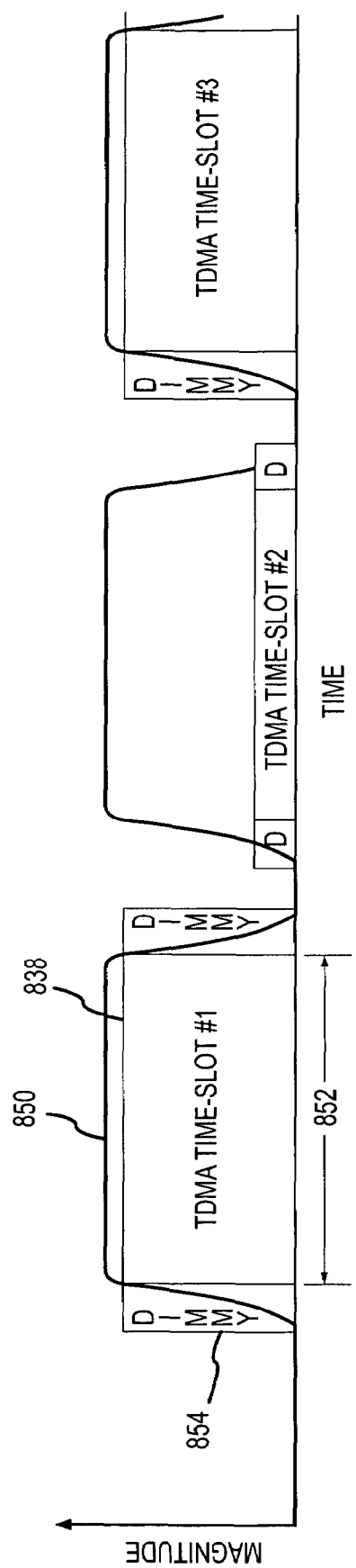
Figure 17:
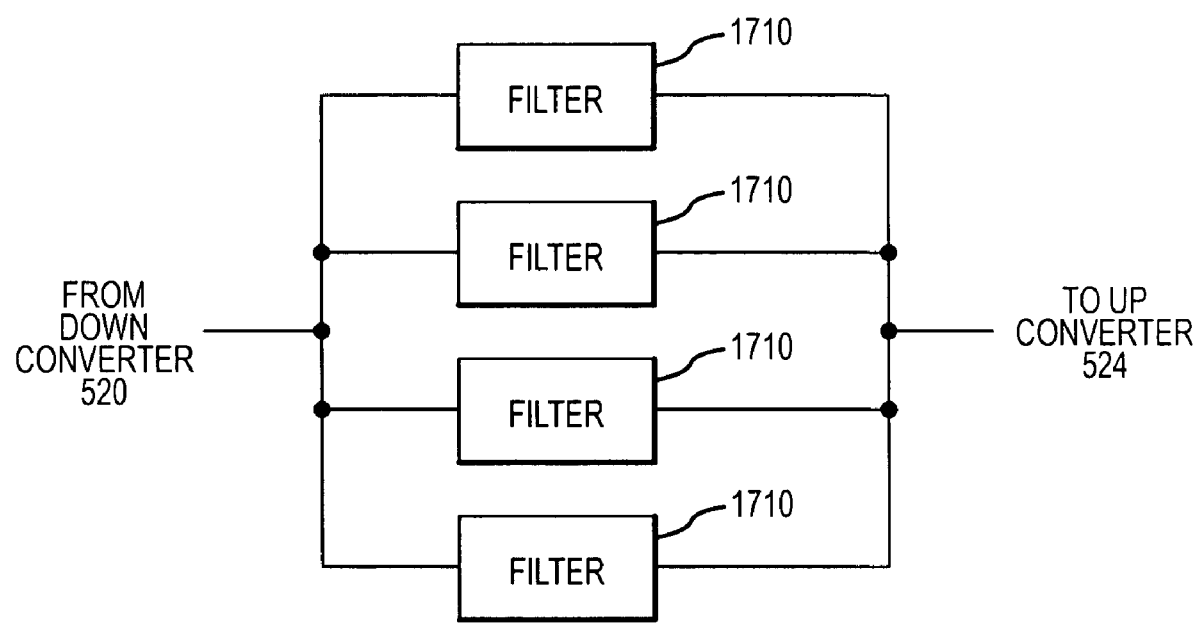
Figure 18:
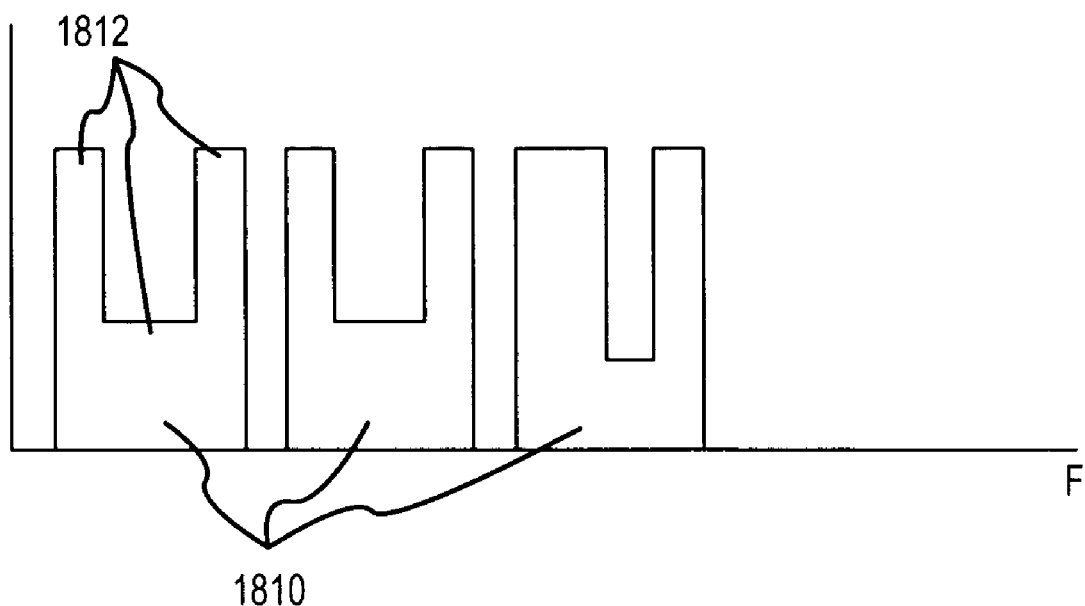
Figure 19:
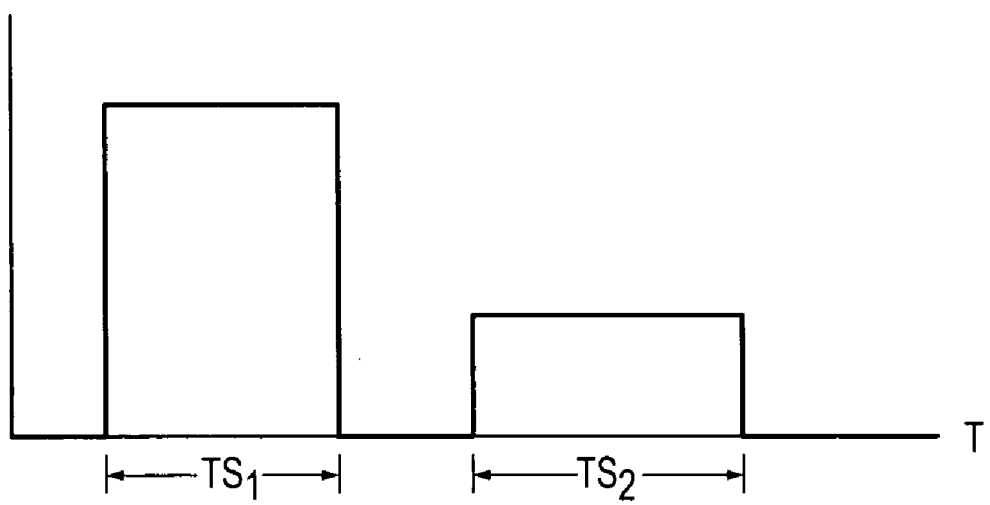

FIGS. 7A-C are frequency diagrams for a signal processed by a filter system;

FIG. 8 is a block diagram of an embodiment of an excursion signal generator;

FIG. 9 is a block diagram of an alternative embodiment of an excursion signal generator;

FIG. 10 is a waveform diagram of various magnitude peaks;

FIGS. 11A-B are waveform diagrams of waveform peaks;

FIG. 12 is a waveform diagram of a sequence of waveform peaks;

FIG. 13 is a block diagram of a filter system having additional filters and a switching system;

FIG. 14 is a block diagram of a peak-power reduction component having an interpolator and a decimator;

FIG. 15 is a block diagram of a peak-power reduction component using fast Fourier transforms (FFTs);

FIG. 16 is a waveform diagram of a sequence of time slots and a time slot windowing signal;

FIG. 17 is a diagram of a filter subsystem for filtering subchannels;

FIG. 18 is a magnitude diagram of a signal comprising multiple channels having subchannels; and FIG. 19 is a magnitude of a signal comprising multiple channels transmitted in a series of time slots.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention is described partly in terms of functional components and various processing steps. Such functional components may be realized by any number of components configured to perform the specified functions and achieve the various results. For example, the present invention may employ various elements, materials, signal sources, signal types, integrated components, amplifiers, filters, and the like, which may carry out a variety of functions. In addition, although the invention is described in the wireless communication environment, the present invention may be practiced in conjunction with any number of applications, environments, communication protocols, amplification systems, and signal processing systems, and the systems described are merely exemplary applications for the invention. Further, the present invention may employ any number of techniques for manufacturing, assembling, testing, and the like.

Figure 1:
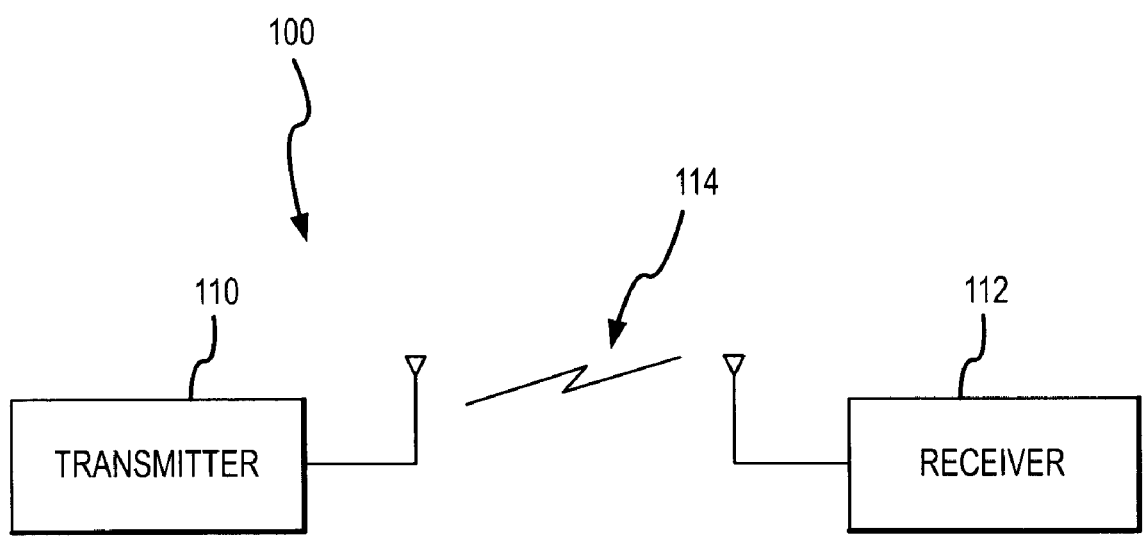
FIG. 1 is a block diagram of a communications system according to various aspects of the present invention.

Referring now to FIG. 1, a communications system 100 according to various aspects of the present invention comprises a transmitter 110 and a receiver 112. The transmitter 110 provides signals to the receiver 112 via a medium 114, such as optical signals, electrical signals, acoustic signals, or any other appropriate medium 114 for transferring signals between the transmitter 110 and the receiver 112. In the present embodiment, the transmitter 110 provides radio frequency signals to the receiver 112, such as wireless telephone signals or wireless data signals.

The transmitter 110 and the receiver 112 are respectively configured to transmit and receive signals transmitted via the medium 114. The transmitter 110 and/or the receiver 112 may be configured as a transceiver to allow the reception and transmission of multiple signals from the same unit. In the present embodiment, the transmitter 110 is configured to modulate and transmit multiple signals to multiple receivers 112, such as a wireless communications base station, and the receivers 112 comprise remote receivers, such as wireless telephones, computers, personal digital assistants, or other such receivers. The communications system 100 may be configured, however, in any suitable manner for communicating between any transmitter 110 and receiver 112, such as computers in a network, for example via a wireless network using single-signal multicarrier modulations like orthogonal frequency division multiplexing (OFDM) or orthogonal frequency division multiple access (OFDMA).

One embodiment of the transmitter 110 is configured to process a digital signal and transmit a corresponding signal to the receiver 112. In a cellular communications embodiment, for example, the transmitter 110 may be configured in accordance with any appropriate specifications for wireless digital communication, such as in accordance with Global System for Mobile (GSM), time division multiple access (TDMA), and/or code division multiple access (CDMA) specifications. In a data communications environment, the transmitter 110 may be configured in conjunction with any suitable data communications standard, such as IEEE 802.11, 802.15, or 802.16. The transmitter 110 may be further configured in any suitable manner to receive digital information and transmit a corresponding analog signal to the receiver 112.

Figure 2:
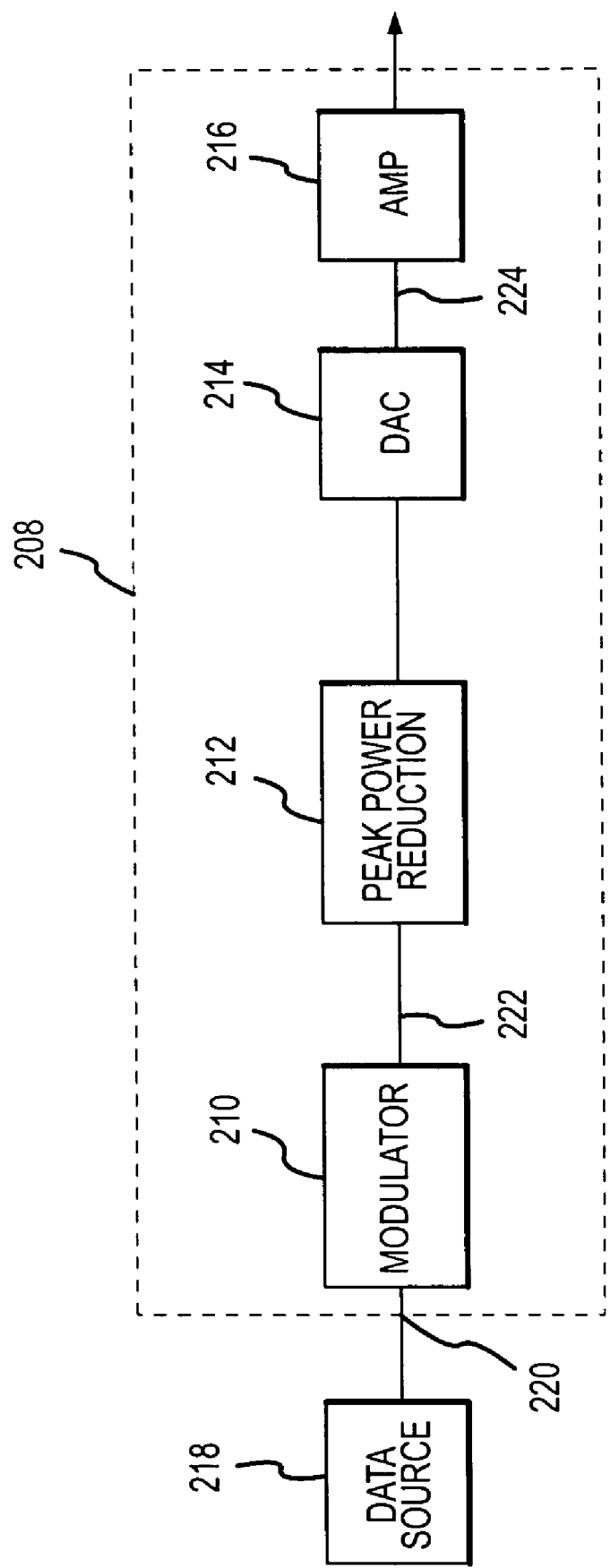
FIG. 2 is a block diagram of a signal processing system having a peak-power reduction component according to various aspects of the present invention.

For example, referring to FIG. 2, the transmitter 110 of the present embodiment includes a signal processing system 208 for processing a signal, such as for communication via the communication system 100. In the present embodiment, the signal processing system includes a modulator 210, a peak-power reduction component 212, a digital-to-analog converter (DAC) 214, and an amplifier 216. The modulator 210 receives digital information 220 from one or more data sources 218 and generates a modulated signal 222. The peak-power reduction component 212 is configured to receive the modulated signal 222 from the modulator 210 and substantially reduce the peak power output requirement of the transmitter 110. The peak-power reduction component 212 may be additionally configured to inhibit spectral regrowth or other frequency components outside one or more desired bandwidths. In addition, the peak-power reduction component 212 may be further configured to inhibit or minimize the addition of noise to the signal to maintain an acceptable signal-to-noise ratio. The DAC 214 is configured to receive a digital signal from the peak-power reduction component 212 and convert the digital signal into an analog signal 224 for transmission. The amplifier 216 amplifies the analog signal 224 for transmission to the receiver 112.

Figure 3:
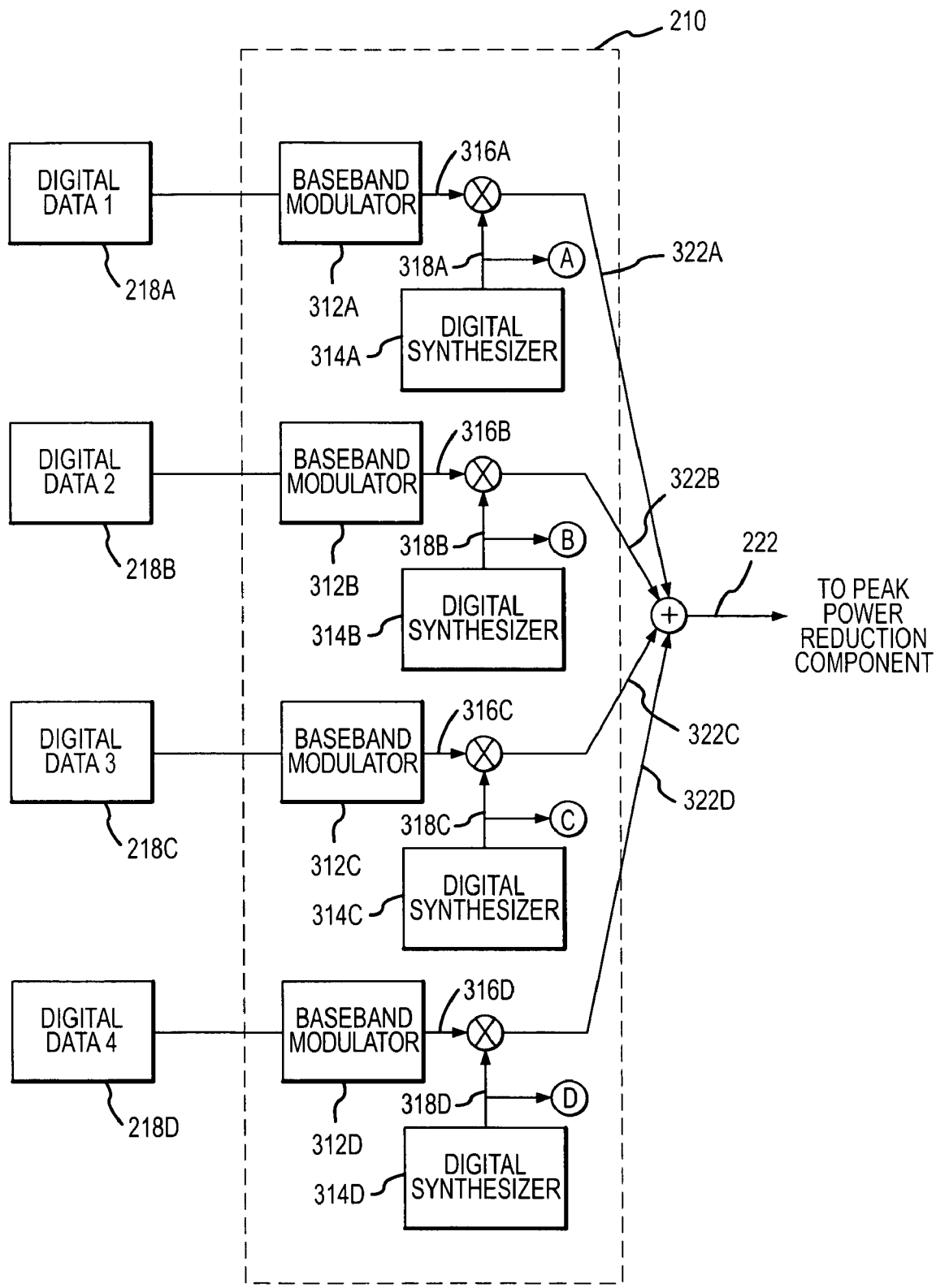
FIG. 3 is a block diagram of a modulator.

The modulator 210 may comprise any suitable system for modulating a digital signal. Referring to FIG. 3, an exemplary modulator 210 comprises a conventional digital modulator and generates an intermediate-frequency (IF) modulated signal 222. The modulator 210 suitably comprises a multi-channel modulator for receiving multiple channels of data, modulating the data for each channel with a different carrier frequency or other signal, and summing the various channel outputs into a composite output signal. The modulator 210 may be configured, however, in any suitable manner, for example as a single-channel modulator.

The present modulator 210 comprises one or more baseband modulators 312 and one or more digital synthesizers 314. Each baseband modulator 312A-D converts data into a baseband waveform according to an appropriate modulation, such that each baseband modulator 312A-D converts information bits, such as compressed binary digital data corresponding to voice, data, or video signals, into a corresponding baseband digital waveform 316A-D. The baseband digital waveforms 316A-D may comprise any suitable waveforms, such as waveforms in accordance with a selected transmission encoding specification, such as GSM, spread spectrum, TDMA, CDMA, or the like. In the present embodiment, the baseband digital waveforms 316A-D comprise time-varying sequences of complex pairs having an in-phase component (I) and a quadrature component (Q) occurring at a defined sample rate.

The digital synthesizer 314 generates a digital carrier frequency signal that is multiplied with the baseband digital waveform to generate the IF modulated signal 222. The digital synthesizer 314 may comprise any appropriate source of a digital carrier frequency or other signal to generate the individual IF modulated signals 322A-D. In the present embodiment, the digital synthesizer 314 comprises a conventional multiple output digital synthesizer configured to provide several different output signals 318A-D at different frequencies. The frequencies suitably correspond to center frequencies for accepted transmission frequencies for a particular cellular, wireless network, or other communication spectral mask.

The present digital synthesizer 314 suitably generates complex exponential (cisoid) signals at the desired center frequencies for the individual IF modulated signals 322A-D for each channel. The digital synthesizer signal 318 is multiplied with the baseband digital waveform 316 for the relevant channel via a multiplier, thus translating each baseband waveform to the proper channel frequency for transmission to generate the individual IF modulated signals 322A-D. The various IF modulated signals 322A-D may be summed to form the composite IF modulated signal 222.

Figure 4:
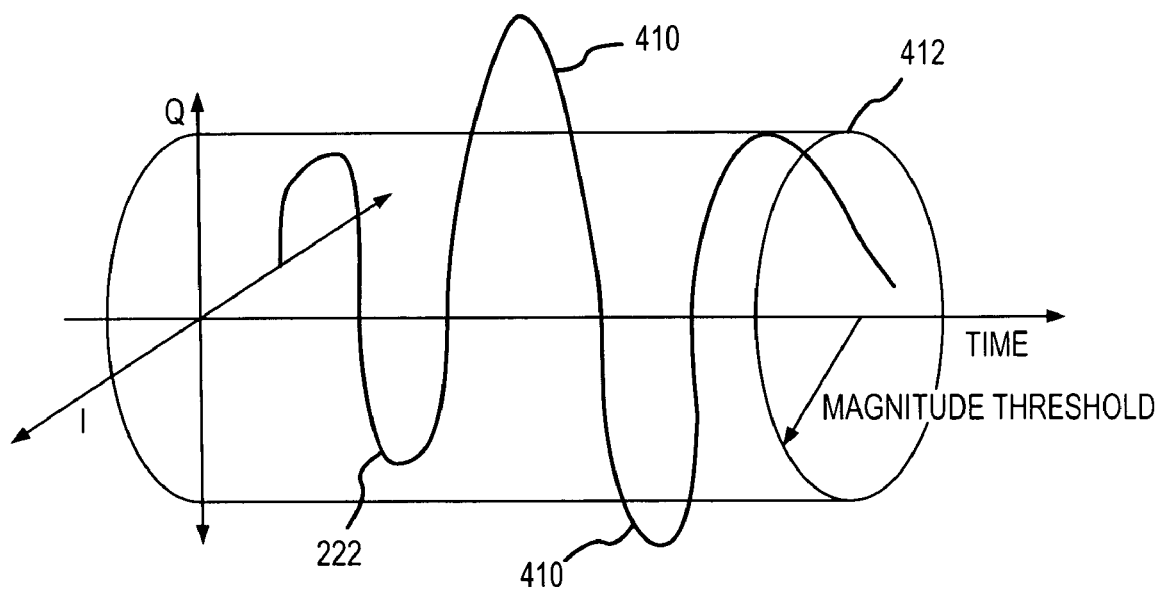
FIG. 4 is an illustration of a complex signal over time and a magnitude threshold.

The composite IF modulated signal 222 is provided to the peak-power reduction component 212. The peak-power reduction component 212 may be configured in any suitable manner to reduce the peak power output of the transmitter 110. The peak-power reduction component 212 may also inhibit transmission of unwanted spectral energy, for example frequency components outside a regulatory spectral mask. The peak-power reduction component 212 receives the IF modulated signal 222 from the modulator 210 and processes the IF modulated signal 222 according to any suitable process. For example, referring to FIG. 4, the peak-power reduction component 212 may be configured to generate an excursion signal in response to a peak portion 410 in the IF modulated signal 222 having a magnitude beyond a defined magnitude threshold 412. The peak-power reduction component 212 suitably removes or reduces the peak portion 410 from the IF modulated signal 222 in response to the excursion signal.

Figure 5:
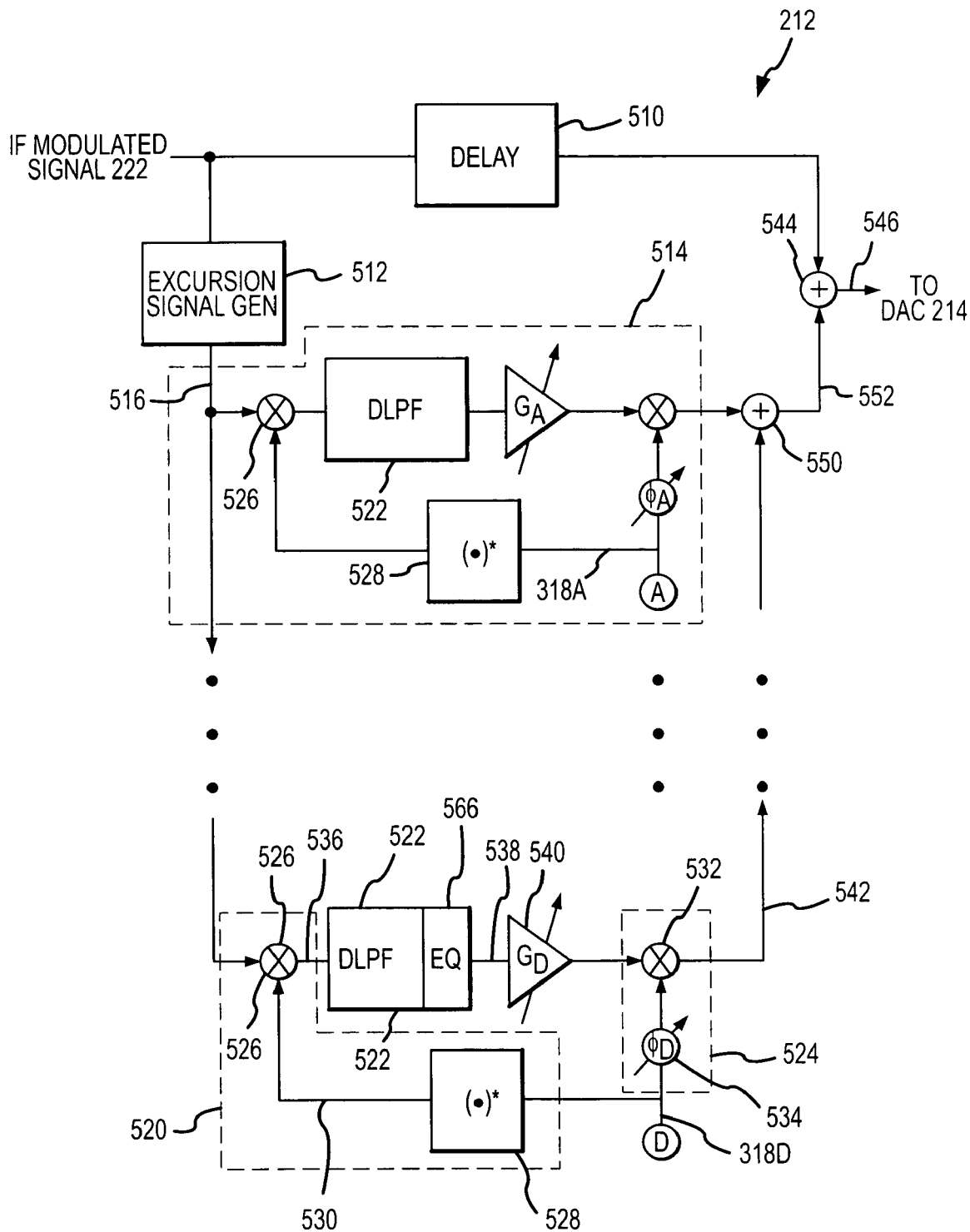
FIG. 5 is a block diagram of a peak-power reduction component.

Referring to FIG. 5, an exemplary embodiment of a peak-power reduction component 212 according to various aspects of the present invention comprises a delay element 510, an excursion signal generator 512, and a filter system 514. The excursion signal generator 512 generates an excursion signal 516 in response to the peak portions 410 in the IF modulated signal 222 exceeding the magnitude threshold 412. The filter system 514 filters unwanted frequencies from the signals processed by the excursion signal generator 512. An excursion reducer 544 subtracts the filtered excursion signal from the IF modulated signal 222. The delay element 510 compensates for propagation time delay through the excursion signal generator 512 and the filter system 514 so that the signal transmitted by the filter system 514 is time-synchronized with the IF modulated signal 222.

The excursion signal generator 512 may be configured in any suitable manner to generate an excursion signal responsive to peak portions of the IF modulated signal 222 or other relevant signal. The excursion signal may then be used in any suitable manner to reduce the peak power of the original signal. In one embodiment, the excursion signal generator 512 receives the IF modulated signal 222 and calculates magnitude values, such as successive magnitude values of the IF modulated signal 222 based on the successive signal complex pairs. The excursion signal generator 512 compares the magnitude of the signal 222 to the magnitude threshold 412. The excursion signal generator 512 generates an excursion signal 516 in response to the portions of the IF modulated signal 222 that exceed the magnitude threshold 412.

The excursion signal generator 512 may be implemented in any suitable manner to generate an excursion signal 516 that may be subtracted from or otherwise used to reduce one or more peaks in the original signal. In one embodiment, the excursion signal generator 512 is suitably configured to generate an excursion signal 516 that corresponds to the full duration of the IF modulated signal 222 that exceeds the magnitude threshold 412, though the excursion signal generator 512 may be configured to generate an excursion signal 516 that corresponds to a greater or lesser duration. For example, referring to FIG. 8, a first exemplary excursion signal generator 800 comprises a magnitude calculation circuit 810, a threshold circuit 812, a waveform generator 814, and a common mode scaling system 820. The magnitude calculation circuit 810 calculates the magnitude of the IF modulated signal 222 and generates a corresponding magnitude signal 816. The magnitude calculation circuit 810 may be implemented in any suitable manner to determine the magnitude of the IF modulated signal 222, such as a conventional circuit configured to calculate the magnitude according to the following equation:

$$M(i)=SQRT(I^2(i)+Q^2(i))$$

where M(i) is the magnitude of the IF modulated signal 222 for a complex sample pair i, I(i) is the in-phase component of the signal for the complex sample pair i, Q(i) is the quadrature component of the signal for the complex sample pair I, and SQRT represents the square-root operation. The magnitude calculation may be performed, however, according to any suitable technique or algorithm.

The magnitude signal 816 is provided to the threshold circuit 812, which compares the calculated magnitude to the magnitude threshold 412 and generates a corresponding comparison signal 818. The threshold circuit 812 may comprise any suitable system for comparing the magnitude of the IF modulated signal 222 to the threshold. For example, the threshold circuit 812 may comprise a conventional comparator circuit or subtraction circuit.

The comparison signal 818 is provided to the waveform generator 814. The waveform generator 814 generates the excursion signal 516 according to the comparison signal 818. The waveform generator 814 may be configured in any suitable manner to generate the excursion signal 516, such as a conventional subtraction circuit to subtract the threshold value from the magnitude component of the IF modulated signal 222. If the comparison signal 818 indicates that the magnitude signal 816 does not exceed the threshold, the waveform generator 814 may generate a null signal. If the comparison signal 818 indicates that the magnitude signal 816 exceeds the threshold, the waveform generator 814 generates a signal having a magnitude corresponding to the difference between the magnitude of the IF modulated signal 222 and the magnitude threshold 412. The resulting excursion signal may then be filtered, scaled, and subtracted from the delayed IF modulated signal 222 to reduce signal peaks.

Figure 6:
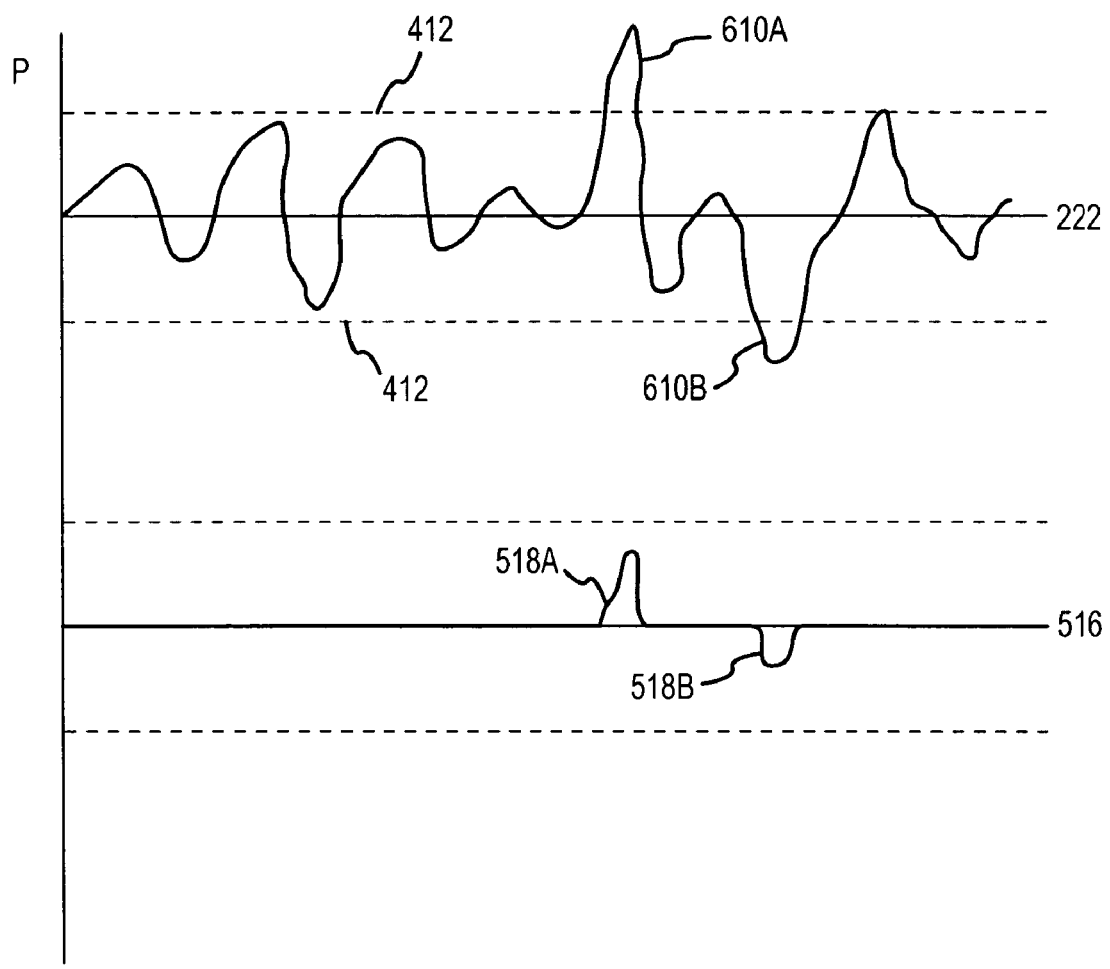
FIG. 6 is a signal diagram of an original signal and an excursion signal.

Thus, referring to FIG. 6, two portions 610A, B of an IF modulated signal 222 segment may exceed the magnitude threshold 412. In response, the excursion signal generator 512 generates a signal comprising two waveforms 518A, B having magnitudes corresponding to the difference between the magnitude of the IF modulated signal 222 and the magnitude threshold 412. The waveforms 518A, B suitably have durations that are substantially identical to the duration of the excursion portions 610A, B, and phase angles that are substantially identical to the phase angles of the excursion portions 610A, B. The excursion signal generator 512 suitably generates a zero value excursion signal in response to portions of the IF modulated signal 222 having magnitudes below the magnitude threshold 412.

The common mode scaling system 820 is configured to adjust the magnitude of the waveform so that the resulting excursion signal reduces the peak in the IF modulated signal 222 to a selected threshold or below. The common mode scaling system 820 receives the unscaled excursion signal from the waveform generator 814 and selectively adjusts the magnitude of the signal to generate the final excursion signal. The common mode scaling system 820 may scale the excursion signal according to any suitable process and may be implemented in any suitable manner. For example, the common mode scaling system 820 may be configured to selectively adjust the unscaled excursion signal such that the controlled magnitude signal 546 does not exceed the selected threshold. For example, if the threshold for a particular system is 1.8 and the magnitude of the IF modulated signal 222 is 4.0, the common mode scaling system 820 is suitably configured to scale the magnitude of the filtered excursion signal to 2.2.

The common mode scaling system 820 may be implemented in any suitable manner to adjust the magnitude of the excursion signal, such as to accommodate different thresholds for different applications, types of modulation, or environments. For example, the common mode scaling system 820 may comprise a memory element, such as a read-only memory, containing a lookup table having multiple inputs. One input suitably comprises the threshold for the particular application or environment. Another input comprises a signal relating to the IF modulated signal 222, such as the magnitude of the peak $M_2$. The lookup table may then output a predetermined scaling factor for adjusting the magnitude of a peak having the particular magnitude $M_2$ to arrive at the desired threshold, which may then be multiplied with the unscaled excursion signal to control the magnitude of the signal.

The common mode scaling system 820 may also be configured to adjust the scaling applied to a peak according to the proximity of the peak to another peak and/or the relative magnitudes of the peaks. For example, in a digital communication environment, two peaks may be related such that a main peak in the signal may induce one or more secondary, lower magnitude peaks. The secondary peaks typically occur within a defined interval with respect to the main peak. Accordingly, the secondary peaks may be identified and subjected to a reduced scaling.

For example, referring to FIG. 12, a main peak 1210 in a signal may be preceded by a preceding peak 1212 and followed by a following peak 1214. The common mode scaling system 820 is suitably configured to selectively adjust the scaling for the preceding peak 1212 and/or the following peak 1214 according to any appropriate criteria, such as whether the preceding peak 1212 or following peak 1214 occurs within a particular interval or the relative magnitude of the main peak 1210 and the preceding peak 1212 or the following peak 1214.

In the present embodiment, the common mode scaling system 820 is configured to determine whether the preceding and following peaks 1212, 1214 are within a particular interval, such as five to seven samples or other suitable interval. In the present example, because the middle sample of the preceding peak 1212 is six samples before the middle sample of the main peak 1210, then the preceding peak is a candidate for adjusted scaling. The middle sample of the following peak 1214 is more than seven samples from the middle sample of the main peak 1210, so the following peak 1214 is not a candidate for adjusted scaling and is suitably scaled like any other peak in the signal.

Candidates for adjusted scaling may be analyzed and scaled (or not scaled at all) according to any suitable criteria. For example, candidates for adjusted scaling may be analyzed for appropriate scaling based on the relative magnitudes of the main peak and the candidate peak. For example, if the candidate peak magnitude is greater than a percentage of the main peak magnitude, such as 50%, then the candidate peak may be subjected to ordinary scaling. If the candidate peak magnitude is at or below the threshold, then the amount of scaling may be decreased by a selected amount, changed to a negative scaling (i.e., increasing the magnitude of the peak), or eliminating the scaling altogether.

In an alternative embodiment, the excursion signal generator 512 may be configured to generate a signal corresponding to narrower portions of the IF modulated signal 222 that exceed the magnitude threshold. Responding to the peaks in the signal using a relatively narrow waveform, i.e. comprising relatively few complex pairs, may assist in minimizing noise added to the signal. For example, the excursion signal generator 512 may be configured to identify peaks in the IF modulated signal 222 and generate the excursion signal 516 in response to peaks exceeding the magnitude threshold 412, in which the responsive waveforms in the excursion signal 516 are narrower than the corresponding peaks in the IF modulated signal 222.

The excursion signal generator 512 may be configured in any suitable manner to generate an excursion signal 516 responsive to magnitude peaks in the incoming signal. For example, referring to FIG. 9, an alternative excursion signal generator 900 comprises a magnitude calculation circuit 810, a peak identification system 910, and a waveform generator 912. The peak identification system 910 identifies magnitude peaks in the incoming signal, and the waveform generator 912 generates the excursion waveform in response to the identified peaks.

The peak identification system 910 may be configured in any suitable manner to identify peaks in the incoming signal, such as via the magnitude signal from the magnitude calculation circuit 810. In the present embodiment, the peak identification system 910 comprises a peak detector 920 and a buffer 922. The peak detector 920 identifies a peak in the incoming signal in any suitable manner, such as by comparing the magnitudes of successive complex pairs in the incoming signal. For example, referring to FIG. 10, if a second magnitude $M_2$ in a sequence of three consecutive magnitudes is greater than a first magnitude $M_1$, and a third magnitude $M_3$ in the sequence is less than the second magnitude $M_2$, then the second magnitude represents a peak magnitude relative to the other magnitudes $M_1$, $M_3$.

The peak detector 920 provides a signal to the buffer 922 when a peak is detected in the incoming signal samples. The buffer 922 is suitably configured to temporarily store the incoming signal while the peak detector 920 identifies the peaks in the incoming signal. The buffer 922 may comprise any suitable storage element, such as a FIFO buffer having an appropriate number of storage elements. When a peak is detected, the buffer 922 suitably provides the relevant data to the waveform generator 912, such as the three complex pairs corresponding to the magnitudes $M_1$, $M_2$, $M_3$ defining the peak samples.

The waveform generator 912 may be configured in any suitable manner to generate a waveform in response to the peak identification system 910 signal samples. In the present embodiment, the waveform generator 912 comprises a peak response system 930. The peak response system 930 is configured to generate an unscaled waveform in response to the detected peak in the incoming signal samples.

The peak response system 930 may be configured in any suitable manner to generate the excursion signal in response to the detected peak for reducing the magnitude of the signal peak. In the present embodiment, the peak response system 930 generates an unscaled excursion signal according to a selected portion, such as three complex pairs, corresponding to the identified peak. The unscaled excursion signal may comprise, however, any suitable number of complex samples corresponding to the peak. For example, the unscaled excursion signal may comprise multiple complex pairs $M_1$, $M_2$, $M_3$ identical to the complex pairs corresponding to the detected peak $M_1$, $M_2$, $M_3$. The unscaled excursion signal may also be adjusted, for example by changing the magnitude of each complex pair according to any suitable criteria, such as increasing or decreasing the magnitude by a selected amount or by a factor.

The excursion signal generator 512 may also be configured to provide any other additional processing that may be desired. For example, the excursion signal generator 512 may be configured to process the excursion signal to promote time- and phase-alignment of the filtered excursion signal with the IF modulated signal. Referring to FIGS. 11A-B, in the present embodiment, the excursion signal generator 512 is configured to add a pedestal P (FIG. 11B) of additional magnitude to an original excursion signal (FIG. 11A). The magnitude of the pedestal may be selected or calculated to achieve an optimal compromise between peak-reduction and the in-band noise added by the peak-reduction processing itself.

The pedestal may comprise a constant value to be added, or may be calculated according to any appropriate criteria, such as according to the maximum amplitude of the excursion signal. In one embodiment, the size of the pedestal is selected by calculating a fraction of the difference between the maximum magnitude and the minimum magnitude of the three complex pairs. For example, the pedestal P may be calculated as one-quarter of the difference between the minimum and maximum amplitudes.

The excursion signal 516 is provided to the filter system 514 to eliminate unacceptable spectral energy, such as frequency components induced by the excursion signal generator 512. The frequencies to be filtered may be selected according to any suitable criteria. In the present embodiment, spectral energy is eliminated at any frequencies other than those approved by the applicable regulatory spectral mask. In systems having multiple spectral energy levels across a particular signal passband, the filter system 514 may be configured to adjust the relative spectral energy levels across the passband to approximately match the in-band variations. For example, if one portion of a channel's average signal spectrum is 10 dB lower than the rest of the signal spectrum, the filter system 514 may introduce a matching 10 dB relative attenuation of the excursion spectrum across the same frequency range.

The filter system 514 may be configured in any suitable manner to substantially filter the unwanted frequencies and transmit the desired frequencies, or otherwise promote the transmission of desired frequencies and/or attenuate unwanted frequencies. For example, the filter system 514 is suitably configured to separate the excursion signal 516 into individual frequency components according to the input channels. The filter system 514 filters individual components of the IF modulated signal 222 to eliminate the unwanted frequencies. Alternatively, the filter system 514 may be configured as a bandpass or bandstop filter to pass the selected frequencies and stop unwanted frequencies, or otherwise configured to remove unwanted frequency components. In addition, the filter system 514 may comprise multiple filter systems, such as a cascade of filter systems or a set of parallel filter systems.

In the present embodiment, the filter system 514 comprises multiple stages for the various channels or subchannels. Each stage suitably comprises a conventional digital filter for removing selected frequencies from the excursion signal for the particular channel. For example, each stage may include a down converter 520, a low pass filter 522, and an up converter 524, and each channel suitably operates in a similar manner. Referring to FIGS. 5 and 7A-C, the down converter 520 receives the excursion signal 516, which exhibits a wide range of frequencies (FIG. 7A). The down converter 520 shifts the frequency of the entire input spectrum to the left, such as by an amount substantially corresponding to the center frequency of the relevant channel. The low pass filter 522 filters input signals to substantially stop signals above a selected cutoff frequency $F_C$ and substantially transmit signals below the selected cutoff frequency (FIG. 7B). The up converter 524 adjusts the frequency of the input signal to a higher frequency, such as to a selected frequency or by a selected amount. In the present embodiment, the up converter 524 shifts the center frequency by an amount substantially corresponding to the center frequency of the relevant channel, i.e. back to the original intermediate frequency IF (FIG. 7C). The various filtered signals are then combined into a composite signal by a filtered signal summer 550.

An exemplary down converter 520 for the present embodiment comprises a multiplier 526 and a complex conjugate generator 528. The complex conjugate generator 528 receives the relevant digital synthesizer signal 318 from the relevant digital synthesizer 314 and generates a complex conjugate signal 530 corresponding to the complex conjugate of the digital synthesizer signal 318. The multiplier 526 multiplies the complex conjugate signal 530 with the excursion signal 516. The resulting down-adjusted signal 536 is a substantially identical waveform as the excursion signal 516, but circularly shifted to the left (reduced in frequency) by an amount substantially equal to the channel center frequency.

The down-adjusted signal 536 is provided to the low-pass filter 522. The low-pass filter 522 may be implemented in any suitable manner and may be configured to use any suitable cutoff frequency. For example, the low-pass filter may comprise a single filter, multiple parallel filters, or a cascade of filters. In the present embodiment, the low-pass filter 522 comprises a digital low-pass filter, such as an infinite impulse response filter, having a cutoff frequency corresponding to one-half the bandwidth of the relevant approved frequency bandwidth. For example, if the approved frequency range is 20 MHz to 20.5 MHz, the cutoff frequency may be set at one-half of the 500 kHz bandwidth, or at 250 kHz. The low pass filter 522 thus transmits a filtered signal 538 comprising the components of the down-adjusted signal 536 that are below the cutoff frequency and filters out any components above the cutoff frequency. The low pass filter 522 suitably comprises an approximately linear phase filter to minimize the amount of phase and/or magnitude error induced by the filter.

In a communications system using subchannels within the various passbands, such as an OFDMA environment, each stage of the filter system 514 may include one or more bandpass or bandstop filters for filtering unwanted frequencies. For example, referring to FIG. 17, the various channels of IF modulated signal 222 may include sub-channels at different frequencies within the channel, such as in an OFDMA system. The filter system 514 suitably includes multiple bandpass filters or series of bandstop filters 1710 for each subchannel configured to filter frequencies other than the subchannel frequency.

In addition, the gain of each subchannel filter 1710 may be adjustable to control the magnitude of the particular subchannel, for example to facilitate adjustment of the relative subchannel spectral energy levels across the passband to approximately match the in-band variations. For example, referring to FIG. 18, the IF modulated signal 222 may comprise multiple main channels 1810, each of which includes multiple subchannels 1812. Each subchannel filter 1710 suitably operates as a magnitude adjustment circuit to adjust the gain for the subchannel to reduce interference between subchannels, such as by adjusting the subchannel filter 1710 magnitudes according to the relative average signal power magnitudes of the corresponding subchannel. Thus, the subchannel filter 1710 may provide greater attenuation of the subchannel excursion signal for a lower magnitude subchannel signal, which tends to reduce the interference attributable to the higher energy levels in the adjacent subchannels.

The filtered signal 538 is transmitted to the up converter 524 for conversion back to the original center frequency IF. In the present embodiment, the up converter 524 comprises a multiplier 532. The multiplier 532 multiplies the filtered signal 538 with the digital synthesizer signal 318 from the digital synthesizer 314 to return the filtered signal 538 to the original center frequency IF.

The signal processing system may also be configured to adjust the magnitude and/or phase of the filtered signal 538. Because the filtered signal is to be subtracted from the IF modulated signal 222, the filtered signal is suitably configured to exactly match the portion of the IF modulated signal 222 that exceeds the threshold 412. The processing of the filtered signal 538, however, may alter its magnitude and phase relative to the IF modulated signal 222. Further, the magnitude of the filtered signal 538 may be adjusted to conform to transmission requirements or other considerations. Consequently, the signal processing system may be configured to adjust the magnitude and/or phase of the filtered signal 538.

The low pass filter 522 suitably comprises an equalized low pass filter to compensate for frequency-dependent changes in the filtered signal 538 propagation delay. The phase equalization function is suitably integrated into the low pass filter system 522, or may comprise a separate equalization circuit 566 for processing the filtered signal 538. Phase equalization causes the composite phase shift as a function of the frequency for the cascade of the channel filter and the equalizer to be as close to linear as possible. The phase equalization function is suitably implemented as an all-pass filter (i.e. all magnitudes are passed with unity magnitude) whose phase-shift-vs-frequency characteristic can be adjusted. The phase equalizer is suitably configured to compensate for phase shifts induced by the low pass filter 522 and/or any other sources of unwanted phase shifts.

In the present embodiment, each individual filter stage for a particular channel also includes a dedicated phase correction element 534 to compensate for different phase errors associated with each individual filter stage, such as phase errors introduced by frequency conversion operations and the propagation delay through each filter. The phase correction element 534 suitably adjusts the phase of the filtered signal 538 according to the radian frequency of the digital synthesizer signal 318 from the digital synthesizer 314 multiplied by the duration of the propagation delay through the filter system 514. For example, the phase correction element 534 may adjust the phase of the digital synthesizer signal 318 prior to using it to up-convert the filtered excursion energy.

The resulting up-converted, phase-adjusted filtered signal 542 comprises a waveform corresponding to the excursion of the IF modulated signal 222 beyond the threshold magnitude. Due to the filtering, the phase-adjusted filtered signal 542 tends to include few or no components having frequencies outside the approved bandwidth, such as components that may be generated via spectral regrowth or generation of noise.

The filtered signal 538 may also be further processed according to any desired criteria. For example, the filtered signal 538 may be provided to a channel scaling circuit 540, for example between the filter 522 and the up converter 524. The channel scaling circuit 540 may adjust the relative signal energy for the multiple signals to control the amount of in-band noise added to the overall signal. The channel scaling circuit 540 is suitably responsive to base station control signals that adjust the transmission power for a particular channel, such as according to the estimated attenuation between the transmitter 110 and the receiver 112.

The channel scaling circuit 540 may also be configured to provide time slot scaling for time division multiple access (TDMA) or time division duplexing (TDD) time slots, for example in conjunction with smooth "window" curves to transition between the nominal scalings used for successive time slots. In particular, various time division schemes, such as those employed by burst CDMA and GSM, require the signal to smoothly decrease in magnitude to substantially zero between time slots. Accordingly, the channel scaling circuit 540 may be configured to apply a time-varying gain to the filtered signal 538. For example, referring to FIG. 16, the channel scaling circuit 540 may apply a unity gain 850 to the filtered signal 538 for most of a time division time slot 852, such as using a Blackman window or Hamming window. At the ends 854 of the time slot 852, the gain is gradually adjusted between zero and unity such that the filtered signal 538 substantially smoothly ramps up from zero to unity gain 850, is held at unity gain 850 for most of the time slot 852, then substantially smoothly ramps back down to zero near the end of the time slot 852.

In one embodiment, the decay rate of the signal from the filter system 514 may be too slow to fully decay before the next time slot time. Accordingly, referring to FIG. 13, the filter system 514 may be configured with additional filters 523 and a switching system 858 for each channel. The additional filters 523 may comprise any number of additional filters 523 that may be required to filter the signal while one or more other filters 523 allow their signals to decay. In the present embodiment, each channel includes two filters 523. The switching system 858 switches the input and output for the channel between the two filters 523 according to a time division timing signal 860. Thus, a first time slot signal is filtered by the first filter 523A. At the end of the time slot, the switching system 858 switches the signal input and output to the second filter 523B. The second filter 523B handles the filtering during the second time slot while the output of the first filter 523A decays to zero. The switching system 858 switches back and forth between the filters 523 so that each filter 523 is allowed to decay for the duration of a time slot before being used for the following time slot.

In various embodiments, the additional filters 523 and the switching system 858 may be unnecessary, for example due to the operation of the time scaling window and the channel scaling circuit 540 adjusting the power of the filtered signal 538 in accordance with the base station control signals. In particular, the nominal gain across each time slot may be varied to match the average relative signal magnitudes in each time slot. For example, referring to FIG. 19, the energy in a first time slot $TS_1$ is significantly higher than the energy in a second time slot $TS_2$. The filter system 514 is suitably configured as a magnitude adjustment circuit to adjust the gain of the filtered signal 538 to a lower magnitude during the second time slot $TS_2$. The filtered energy from a high-level time slot excursion is suitably attenuated sufficiently to reduce potential interference with a weaker signal in a subsequent time slot. The channel scaling circuit 540 is configured to adjust the amplitude of the filtered signal 538, which includes the portion of the signal that may be caused by the extended decay of the filter. As a result, the portion of the filtered signal 538 attributable to the extended decay of the filter is attenuated, which tends to reduce its effect on the intended signal.

The composite phase-adjusted filtered signal 552 is provided to the excursion reducer 544. The excursion reducer 544 also receives the IF modulated signal 222 via the delay element 510. The delay element 510 is configured to compensate for the propagation time of the signal through the excursion signal generator 512, frequency adjusters 520, 524, filter 522, and/or other components. The excursion reducer 544 combines the IF modulated signal 222 and the phase-adjusted filtered signal 542, for example, by subtracting the phase-adjusted filtered signal 542 from the IF modulated signal 222. The excursion reducer 544 generates a controlled magnitude signal 546 having a magnitude within the threshold 412 and with few or no components outside the approved bandwidth. The controlled magnitude signal 546 is provided to the DAC 214, which converts the controlled magnitude signal 546 into an analog signal 224 for amplification and transmission.

The communication system 100 may be used in various environments to transfer information, and may be adapted to the particular environment or application. In various applications, the filter system 514, the excursion signal generator 512, or other elements of the system may be changed or optimized for the environment or application. Further, additional elements may be added to or removed from the communications system 100 to facilitate or improve operation for the particular environment or application.

For example, various applications or environments may utilize relatively low sampling rates compared to the carrier frequencies. For example, under certain wireless communication standards, such as systems conforming to standards such as IEEE 802.11 and 802.16 standards employing orthogonal frequency division multiplexing (OFDM), sampling rates may approach the Nyquist limits for the carrier frequencies. The peak-power reduction component 212 may be configured for improved operation in such low sampling rate applications.

For example, the peak-power reduction component 212 may be adapted to reduce noise in the signals of interest. In one embodiment, the peak-power reduction component 212 is suitably configured to inhibit the addition of noise to the signals of interest that may be caused by the peak-power reduction process, such as intermodulation noise generated by the excursion signal generator 512. In particular, the sampling frequency of the IF modulated signal 222 may be artificially increased above the carrier frequency to inhibit aliasing of the excursion energy into the signal spectrum.

Referring to FIG. 14, an alternative exemplary embodiment of a peak-power reduction component 212 according to various aspects of the present invention comprises the delay element 510, the excursion signal generator 512, the filter system 514, a sampling rate increase system 560, and a sampling rate reduction system 562. The sampling rate increase system 560 increases the sampling rate of the IF modulated signal 222, while the sampling rate reduction system 562 correspondingly reduces the sampling rate of the IF modulated signal to its original rate. By increasing the sampling rate of the IF modulated signal 222 before generating the excursion signal, noise components that tend to be caused by aliasing are generated at higher frequencies than the carrier frequencies, and may thus be filtered by the filter system 524.

The sampling rate increase system 560 may comprise any suitable system for increasing the sampling rate of the IF modulated signal 222. In the present embodiment, the sampling rate increase system 560 includes an interpolator configured to generate intermediate samples based on the original samples in the IF modulated signal 222. The interpolator may generate the intermediate samples according to any suitable algorithm, such as a linear interpolation. In addition, the interpolator may generate any suitable number of intermediate samples to achieve a desired increased frequency. In the present embodiment, the interpolator increases the sampling rate by a factor of about four.

Likewise, the sampling rate reduction system 562 may comprise any suitable system for decreasing the sampling rate of signal from the filter system 514 back to the original sampling rate. In the present embodiment, the sampling rate reduction system 562 includes a decimator configured to remove intermediate samples from the signal. In the present embodiment, the decimator decreases the sampling rate by a factor of about four to return the signal to the original sampling rate of the IF modulated signal.

In the OFDM environment, the filter system 514 may include an OFDM spectral mask 564 configured to provide conformance to the regulatory and standard-based spectral constraints. The peak-power reduction component 212 may also perform additional processing, such as substantially removing the DC component of the signal, for example by subtracting the average of the in-phase and quadrature components of the signal from the samples corresponding to the original samples.

The filter system 514 may be further adapted for systems using fast Fourier transforms (FFTs), such as an OFDMA communications system under the IEEE 802.16 standard. For example, referring to FIG. 15, another alternative exemplary embodiment of a peak-power reduction component 212 according to various aspects of the present invention comprises the delay element 510, the excursion signal generator 512, the filter system 514, the sampling rate increase system 560, and the sampling rate reduction system 562. The modulator 210 is configured to generate a signal, such as an 802.16a OFDM symbol having cyclic prefix data. In the present embodiment, the filter system 514 includes an FFT filter system. To facilitate the use of the FFTs, the sampling rate increase system 560 is suitably configured to increase the sampling rate of the IF modulated signal 222 such that the total number of samples in the OFDM sample corresponds to a power of two, such as by a factor of four. Similarly, the sampling rate reduction system 562 reduces the sampling rate of the IF modulated signal by the same amount.

Alternatively, the excursion waveform may only be generated for the raw OFDMA waveform, excluding the cyclic prefix, and the output of the peak-reduction then modified to create a cyclic prefix corresponding to the peak-reduction waveform itself, with the composite waveform then subtracted from the delayed signal to accomplish peak reduction. For example, the excursion waveform may be generated without the cyclic prefix. After the peak reduction process, for example after the summing of the various filtered excursions, a cyclic prefix may then be generated based on the peak-reduction waveform. The prefix is then attached to the front and back end of the transmitted signal.

In operation, the communications system 100 provides for communications while substantially reducing the peak-power of the signal and/or improving the overall signal link using the same peak-power. The communications system 100 also suitably inhibits transmission of frequencies outside of approved bandwidths. In particular, the modulator 210 generates the IF modulated signal 222 according to digital data received from the data source 218. The IF modulated signal 222 is provided to the delay element 510 and the excursion signal generator 512. The excursion signal generator 512 identifies portions of the IF modulated signal 222 beyond the desired threshold and generates a corresponding excursion signal 516. The excursion signal comprises any suitable signal for reducing the peak in the IF modulated signal 222.

The excursion signal 516 is provided to the filter system 514 to remove any components in the excursion signal 516 outside of the approved bandwidths. In particular, the excursion signal 516 is provided to the down converter 520, which changes the center frequency of the signal from the intermediate frequency to a lower frequency, such as baseband. The down-adjusted signal is then provided to the low-pass filter 522, which filters out frequencies above the cutoff frequency. In the present embodiment, the cutoff frequency corresponds to one half the bandwidth of the approved bandwidth. The filtered signal 538 is then adjusted by the up converter 524 to return the signal's center frequency to the intermediate frequency. The filtered signal, including subchannels within a particular passband or channel, may also be processed for phase and magnitude adjustment to compensate for changes induced by the excursion signal generator 512 and the filter system 514.

In a system using subchannels, the filter system 514 may adjust the magnitude of the various subchannel filters according to the magnitudes of the subchannels in the signal. Consequently, subchannel signals in the excursion signal having lower magnitudes are subjected to greater attenuation than those having greater magnitudes. In a time division environment, the filter system 514 may adjust the magnitude of the various time slots for the excursion signal according to the magnitudes of the signal. Thus, excursion channel time slots corresponding to signal channel time slots having lower energy magnitudes are subjected to greater attenuation than excursion channel time slots corresponding to signal channel time slots having greater energy magnitudes. The filter system 514 may also apply a smoothing window to the excursion signal.

The composite filtered signal 552 comprises a waveform corresponding to the waveform of the excursion beyond the threshold in the IF modulated signal 222. By filtering the excursion signal, unwanted frequency components, such as those attributable to spectral regrowth or other signal processing effects, may be eliminated from the composite filtered signal 552. When this composite filtered signal 552 is subtracted from the delayed IF modulated signal 222 by the excursion reducer, the resulting controlled magnitude signal 546 tends to remain within the threshold and exhibit few or no unwanted frequency components introduced by the peak-power reduction component 212. Consequently, the peak-power of the signal decreases, facilitating use of a lower cost amplifier 216.

In addition, the peak-power reduction component 212 need not precisely determine the instant at which an excursion peak occurs, or the amplitude or phase of the peak. Instead, the entire excursion waveform or a narrow peak portion of the waveform is filtered and subtracted from the IF modulated signal 222 with corrections for delays and equalization. Further, the peak-power reduction component suitably operates in the same manner, regardless of the number of input signals.

The composite filtered signal 552 may be provided to the excursion reducer 544 or subjected to further processing. Additional processing may comprise any suitable processing, such as to improve the signal or adapt the signal to a particular environment. For example, the composite filtered signal 552 may be processed using further peak-power reduction processing or filtering, such as via another peak-power reduction component 212 or filter system 514. Additional noise may exist in the signal, such as due to filter response in the preceding peak-power reduction processing and/or filtering or other sources. Repetitive peak-power reduction processing and/or filtering may reduce such noise.

In addition, the communications system 100 may be reconfigured to take advantage of the reduced peak-power requirements due to the peak-power reduction component 212. For example, the communications system may be designed or reconfigured to use a lower-power amplifier to transmit signals. In addition, the communications system 100 may be configured to use the additional available power made available by the peak-power reduction component 212 to improve the link between the transmitter 110 and the receiver 112 and/or expand the coverage of the signal.

For example, the magnitude threshold 412 may be set at a selected level to reduce the overall peak-power demand of the transmitter 110. The signal of the transmitter may then be boosted by the same amount so that the peak-power requirement of the system returns to its original level, but the average power of the transmitter signal increases. For example, if the threshold is originally set to reduce the peak-power requirement by 3 dB, the power of the transmitted signal may be increased by 3 dB to achieve the original peak-power. Thus, the same amplifier may be used to deliver a higher power signal.

Reducing the level of the magnitude threshold 412 may raise the noise level in the transmitted signal. In many applications, however, the noise in the transmitted signal is relatively low compared to the ordinary noise level at the receiver, for example thermal noise. As a result, because the noise level has only slightly increased while the power of the transmitted signal has significantly increased, the signal-to-noise ratio (SNR) at the receiver tends to improve.

In various environments, the reduction of the magnitude threshold 412 to boost the transmission power may be unacceptable, for example by causing the SNR at the transmitter to contravene standards that may apply. For example, current IEEE 802.16 standard requires the transmitter SNR to be no less than 19.6 dB. If the magnitude threshold 412 for the transmitter 110 is reduced beyond a point, the induced noise from generating the excursion may cause the SNR to drop below the 19.6 dB minimum, despite the improved overall quality of the link. In such environments, the improved link quality may be implemented as an option. For example, the transmitter 110 and receiver 112 may be configured to initially operate in accordance with the relevant standard. The transmitter 110 and receiver 112 may communicate to establish whether the other may operate using the improved quality link. If the units share the ability to communicate with the improved quality link, the transmitter 110 and receiver 112 may be reconfigured, either manually or automatically, to reduce the magnitude threshold 412 to the lower level and boost the respective transmission levels.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

The present invention has been described above with reference to a preferred embodiment. However, changes and modifications may be made to the preferred embodiment without departing from the scope of the present invention. These and other changes or modifications are intended to be included within the scope of the present invention.

The invention claimed is:

1. A communication system, including:
    a transmitter, including:
    an excursion signal generator configured to identify an excursion event in a first signal exceeding a threshold and generate an excursion signal corresponding to the excursion event, wherein the excursion event is comprised of a plurality of signal samples having magnitudes which exceed the threshold and wherein the first signal includes multiple channels having multiple subchannels, and the excursion signal includes corresponding channels and subchannels; and
    an excursion reducer responsive to the excursion signal generator and configured to subtract the excursion signal from the first signal, wherein the excursion signal subtracted from the first signal is comprised of signal samples having magnitudes which exceed the threshold, the excursion reducer including:
        a filter system configured to filter selected frequencies in the excursion signal; and
        a magnitude adjustment system configured to adjust magnitudes of the excursion signal subchannels according to magnitudes of the first signal subchannels; and
    a receiver configured to receive the first signal.

2. A communication system according to claim 1, wherein the magnitude adjustment system is configured to adjust a magnitude of the excursion signal in a time slot according to a magnitude of the first signal in the time slot.

3. A communication system according to claim 1, wherein the excursion reducer further comprises a sampling rate increase system configured to increase a sampling rate of the excursion signal.

4. A communication system according to claim 3, wherein the sampling rate increase system includes an interpolator.

5. A communication system according to claim 3, wherein:
    the sampling rate increase system is configured to adjust the total number of samples in a set of samples to a power of two; and
    the filter system uses fast Fourier transforms.

6. A communication system according to claim 1, wherein the first signal is at least one of an OFDM signal, an OFDMA signal, a TDMA signal, and a TDD signal.

7. A communication system according to claim 1, further including:
    a second excursion signal generator configured to identify a second excursion in the first signal following subtraction of the excursion signal and generate a corresponding second excursion signal; and
    a second excursion reducer responsive to the first signal following subtraction of the first excursion signal, wherein the second excursion reducer is configured to subtract the second excursion signal from the first signal following subtraction of the first excursion signal.

8. A communication system according to claim 1, wherein the transmitter is configured to increase an average magnitude of the first signal according to a magnitude of the threshold.

9. A communication system according to claim 1, wherein the transmitter is configured to indicate a capability to operate using an enhanced communication link, wherein the enhanced communication link includes contravening a communication standard.

10. A communication system according to claim 1, wherein:
    the first signal includes a TDMA signal; and
    the excursion reducer further includes a magnitude scaling circuit configured to scale the excursion signal according to a TDMA window.

11. A communication system according to claim 1, wherein the filter system is configured to filter frequencies outside of a regulatory spectral mask.

12. A communication system according to claim 1, wherein the filter system includes more than one stage, and wherein each stage is configured to filter a channel of the excursion signal.

13. A communication system according to claim 12, wherein at least one stage includes a phase correction element configured to compensate for phase changes in the excursion signal.

14. A communication system according to claim 1, wherein the excursion reducer is configured to subtract the excursion signal from the first signal without estimating at least one of a time, a magnitude, or a phase of a signal peak.

15. A communication system according to claim 1, wherein the excursion signal generator is configured to calculate a magnitude of the first signal, compare the magnitude to the threshold, and generate an excursion signal.

16. A communication system according to claim 15, wherein the excursion signal generator is further configured to add a pedestal to the excursion signal.

17. A communication system according to claim 16, wherein a magnitude of the pedestal is calculated according to at least two samples in the excursion.

18. A communication system according to claim 15, wherein the excursion signal corresponds to a difference between a magnitude of the first signal and the threshold if the magnitude of the first signal exceeds the threshold.

19. A communication system according to claim 1, wherein the excursion signal generator includes:
    a peak identification system configured to identify a peak in the first signal; and
    a waveform generator responsive to the peak identification system and configured to generate the excursion signal according to at least one of the magnitude and the occurrence of the peak.

20. A communication system according to claim 19, wherein the peak includes a set of three consecutive samples, wherein the middle sample has a higher magnitude than the first and third samples.

21. A communication system according to claim 19, wherein the waveform generator includes:
   a peak response system configured to generate the excursion signal; and
   a scaling system configured to adjust the magnitude of the excursion signal.

22. A communication system according to claim 21, wherein the scaling system is configured to adjust the magnitude of the excursion signal according to the threshold, and wherein the threshold includes a selected threshold from a plurality of thresholds.

23. A communication system according to claim 21, wherein the scaling system is configured to adjust the magnitude of the excursion signal according to the magnitude of a proximate peak to the peak.

24. A communication system according to claim 23, wherein the proximate peak is defined according to a selected range of samples from the peak.

25. A communication system according to claim 23, wherein the scaling system is configured to adjust the magnitude of the excursion signal according to the relative magnitudes of the proximate peak and the peak.

26. A communication system according to claim 1, wherein the transmitter further includes a phase compensation system configured to compensate for phase changes in the first signal.

27. A signal processing system, including:
   an excursion signal generator configured to identify an excursion event in a main signal, wherein the excursion event is comprised of a plurality of signal samples and wherein the main signal and the excursion event include multiple channels having subchannels; and
   an excursion reducer configured to subtract an excursion signal corresponding to the excursion event from the main signal, wherein the excursion signal includes multiple channels and subchannels corresponding to the multiple channels and subchannels of the excursion event, said excursion reducer including:
      a filter system configured to filter selected frequencies from the excursion signal; and
      a magnitude adjustment system configured to adjust magnitudes of the excursion signal subchannels according to magnitudes of the main signal subchannels.

28. A signal processing system according to claim 27, wherein the filter system includes a magnitude adjustment system configured to adjust a magnitude of the excursion signal in a time slot according to a magnitude of the first signal in the time slot.

29. A signal processing system according to claim 27, wherein the main signal is at least one of an OFDM signal, an OFDMA signal, a TDMA signal, and a TDD signal.

30. A signal processing system according to claim 27, further including:
   a second excursion signal generator configured to identify a second excursion in the main signal following subtraction of the first excursion; and
   a second excursion reducer responsive to the main signal following subtraction of the first excursion, wherein the second excursion reducer is configured to subtract the second excursion from the main signal following subtraction of the first excursion.

31. A signal processing system according to claim 27, wherein the signal processing system is configured to increase an average magnitude of the main signal when the excursion reducer is activated.

32. A signal processing system according to claim 27, wherein the signal processing system is configured to indicate a capability to operate using an enhanced communication link, wherein the enhanced communication link includes contravening a communication standard.

33. A signal processing system according to claim 27, wherein:
   the main signal includes a TDMA signal; and
   the excursion reducer further includes a magnitude scaling circuit configured to scale the excursion according to a TDMA window.

34. A communication system according to claim 27, wherein the filter system includes a magnitude adjustment system configured to adjust a magnitude of the excursion signal in a time slot according to a magnitude of the first signal in the time slot.

35. A communication system according to claim 27, wherein the excursion reducer further comprises a sampling rate increase system configured to increase a sampling rate of the excursion signal.

36. A signal processing system according to claim 35, wherein the sampling rate increase system includes an interpolator.

37. A signal processing system according to claim 35, wherein:
   the sampling rate increase system is configured to adjust the total number of samples in a set of samples to a power of two; and
   the filter system uses fast Fourier transforms.

38. A signal processing system according to claim 27, wherein:
   the excursion signal generator is configured to generate an excursion signal corresponding to the excursion;
   the filter system is configured to filter the excursion signal; and
   the excursion reducer is configured to subtract the filtered excursion signal from the main signal.

39. A signal processing system according to claim 38, wherein the filter system is configured to filter frequencies outside of a regulatory spectral mask.

40. A signal processing system according to claim 38, wherein the filter system includes more than one stage, and wherein each stage is configured to filter a channel of the main signal.

41. A signal processing system according to claim 40, wherein at least one stage includes a phase correction element configured to compensate for phase changes in the main signal.

42. A signal processing system according to claim 27, wherein the excursion reducer is configured to subtract the excursion signal from the main signal without estimating an occurrence of a signal peak.

43. A signal processing system according to claim 27, wherein the excursion signal generator is configured to calculate a magnitude of the main signal, compare the magnitude to a threshold, and generate an excursion signal.

44. A signal processing system according to claim 43, wherein the excursion signal generator is further configured to add a pedestal to the excursion signal.

45. A signal processing system according to claim 44, wherein a magnitude of the pedestal is calculated according to at least two samples in the excursion.

46. A signal processing system according to claim 43, wherein the excursion signal corresponds to a difference between a magnitude of the main signal and the threshold if the magnitude of the main signal exceeds the threshold.

47. A signal processing system according to claim 43, wherein the excursion signal has a duration that is substantially identical to a duration of the excursion.

48. A signal processing system according to claim 27, wherein the excursion signal generator includes:
a peak identification system configured to identify a peak in the first signal; and
a waveform generator responsive to the peak identification system and configured to generate the excursion signal according to at least one of the magnitude and the occurrence of the peak.

49. A signal processing system according to claim 48, wherein the peak includes a set of three consecutive samples, wherein the middle sample has a higher magnitude than the first and third samples.

50. A signal processing system according to claim 48, wherein the waveform generator includes:
a peak response system configured to generate the excursion signal; and
a scaling system configured to adjust the magnitude of the excursion signal.

51. A signal processing system according to claim 50, wherein the scaling system is configured to adjust the magnitude of the excursion signal according to the threshold, and wherein the threshold includes a selected threshold from a plurality of thresholds.

52. A signal processing system according to claim 50, wherein the scaling system is configured to adjust the magnitude of the excursion signal according to the magnitude of a proximate peak to the peak.

53. A signal processing system according to claim 52, wherein the proximate peak is defined according to a selected range of samples from the peak.

54. A signal processing system according to claim 52, wherein the scaling system is configured to adjust the magnitude of the excursion signal according to the relative magnitudes of the proximate peak and the peak.

55. A signal processing system according to claim 27, wherein the transmitter further includes a phase compensation system configured to compensate for phase changes in the main signal.

56. A transmitter system, including:
an excursion identifier configured to identify an excursion event in a main signal, wherein the excursion event is comprised of a plurality of signal samples and wherein the excursion event and the main signal include multiple channels having subchannels; and
an excursion reducer configured to subtract the excursion event from the main signal, including:
a filter system configured to filter selected frequencies from the excursion event; and
a magnitude adjustment system configured to adjust magnitudes of the excursion event subchannels according to magnitudes of the main signal subchannels.

57. A transmitter system according to claim 56, wherein the magnitude adjustment system is configured to adjust a magnitude of the excursion signal in a time slot according to a magnitude of the main signal in the time slot.

58. A transmitter system according to claim 56, wherein the excursion reducer further comprises a sampling rate increase system configured to increase a sampling rate of the excursion signal.

59. A transmitter system according to claim 58, wherein the sampling rate increase system includes an interpolator.

60. A transmitter system according to claim 58, wherein:
the sampling rate increase system is configured to adjust the total number of samples in a set of samples to a power of two; and
the filter system uses fast Fourier transforms.

61. A transmitter system according to claim 56, wherein the main signal is at least one of an OFDM signal, an OFDMA signal, a TDMA signal, and a TDD signal.

62. A transmitter system according to claim 56, further including: a second excursion identifier configured to identify a second excursion in the main signal following subtraction of the first excursion signal; and
a second excursion reducer responsive to the main signal following subtraction of the first excursion, wherein the second excursion reducer is configured to subtract the second excursion from the main signal following subtraction of the first excursion.

63. A transmitter system according to claim 56, wherein the transmitter system is configured to increase an average magnitude of the main signal when the excursion reducer is activated.

64. A transmitter system according to claim 56, wherein the transmitter system is configured to indicate a capability to operate using an enhanced communication link, wherein the enhanced communication link includes contravening a communication standard.

65. A transmitter system according to claim 56, wherein:
the first signal includes a TDMA signal; and
the excursion reducer further includes a magnitude scaling circuit configured to scale the excursion signal according to a TDMA window.

66. A transmitter system according to claim 56, further including a filter system, wherein:
the excursion identifier is configured to generate an excursion signal corresponding to the excursion;
the filter system is configured to filter the excursion signal; and
the excursion reducer is configured to subtract the filtered excursion signal from the main signal.

67. A transmitter system according to claim 66, wherein the filter system is configured to filter frequencies outside of a regulatory spectral mask.

68. A transmitter system according to claim 66, wherein the filter system includes more than one stage, and wherein each stage is configured to filter a channel of the main signal.

69. A transmitter system according to claim 68, wherein at least one stage includes a phase correction element configured to compensate for phase changes in the main signal.

70. A transmitter system according to claim 56, wherein the excursion reducer is configured to subtract the excursion signal from the main signal without estimating an occurrence of a signal peak.

71. A transmitter system according to claim 56, wherein the excursion signal generator is configured to calculate a magnitude of the main signal, compare the magnitude to a threshold, and generate an excursion signal.

72. A transmitter system according to claim 71, wherein the excursion signal generator is further configured to add a pedestal to the excursion signal.

73. A transmitter system according to claim 72, wherein a magnitude of the pedestal is calculated according to at least two samples in the excursion.

74. A transmitter system according to claim 71, wherein the excursion signal corresponds to a difference between a magnitude of the main signal and the threshold if the magnitude of the main signal exceeds the threshold.

75. A transmitter system according to claim 56, wherein the excursion signal generator includes:
  a peak identification system configured to identify a peak in the first signal; and
  a waveform generator responsive to the peak identification system and configured to generate the excursion signal according to at least one of the magnitude and the occurrence of the peak.

76. A transmitter system according to claim 75, wherein the peak includes a set of three consecutive samples, wherein the middle sample has a higher magnitude than the first and third samples.

77. A transmitter system according to claim 75, wherein the waveform generator includes:
  a peak response system configured to generate the excursion signal; and
  a scaling system configured to adjust the magnitude of the excursion signal.

78. A transmitter system according to claim 77, wherein the scaling system is configured to adjust the magnitude of the excursion signal according to a threshold, and wherein the threshold includes a selected threshold from a plurality of thresholds.

79. A transmitter system according to claim 77, wherein the scaling system is configured to adjust the magnitude of the excursion signal according to the magnitude of a proximate peak to the peak.

80. A transmitter system according to claim 79, wherein the proximate peak is defined according to a selected range of samples from the peak.

81. A transmitter system according to claim 79, wherein the scaling system is configured to adjust the magnitude of the excursion signal according to the relative magnitudes of the proximate peak and the peak.

82. A transmitter system according to claim 56, wherein the transmitter further includes a phase compensation system configured to compensate for phase changes in the excursion signal.

83. A method for processing signals, including:
  identifying an excursion event in a main signal, wherein the excursion event is comprised of a plurality of signal samples and wherein the excursion event and the main signal include multiple channels having subchannels;
  filtering selected frequencies in the excursion event;
  adjusting magnitudes of the excursion event subchannels according to magnitudes of the main signal subchannels; and
  subtracting the excursion event from the main signal.

84. A method for processing signals according to claim 83, further comprising increasing a sampling rate of the excursion.

85. A method for processing signals according to claim 84, wherein increasing the sampling rate includes interpolating the excursion.

86. A method for processing signals according to claim 84, wherein:
  increasing the sampling rate includes adjusting the total number of samples in a set of samples to a power of two; and
    filtering selected frequencies includes using fast Fourier transforms.

87. A method for processing signals according to claim 83, wherein adjusting magnitudes of the excursion signal subchannels includes adjusting a magnitude of the excursion in a time slot according to a magnitude of the main signal in the time slot.

88. A method for processing signals according to claim 83, wherein the main signal is at least one of an OFDM signal, an OFDMA signal, a TDMA signal, and a TDD signal.

89. A method for processing signals according to claim 83, further including:
  identifying a second excursion in the main signal after subtracting the first excursion signal from the main signal; and
    subtracting the second excursion from the main signal after subtracting the first excursion from the main signal.

90. A method for processing signals according to claim 83, further including increasing an average magnitude of the main signal according to the magnitude of an excursion threshold.

91. A method for processing signals according to claim 83, further including indicating a capability to operate using an enhanced communication link, wherein the enhanced communication link includes contravening a communication standard.

92. A method for processing signals according to claim 83, wherein the main signal includes a TDMA signal, and further including scaling the excursion according to a TDMA window.

93. A method for processing signals according to claim 84, wherein increasing the sampling rate of the excursion includes interpolating the main signal.

94. A method according to claim 83, further including:
  generating an excursion signal according to the identified excursion; and
  filtering the excursion signal, wherein subtracting the excursion includes subtracting the filtered excursion signal from the main signal.

95. A method according to claim 83, wherein filtering the excursion signal includes filtering frequencies outside of a spectral mask.

96. A method according to claim 83, further including compensating for phase changes in the main signal.

97. A method according to claim 83, wherein subtracting the excursion from the main signal includes subtracting the excursion from the main signal without estimating an occurrence of a signal peak.

98. A method according to claim 83, wherein identifying the excursion includes:
  calculating a magnitude of the main signal;
  comparing the magnitude to a threshold; and
  generating an excursion signal according to the comparison of the magnitude to the threshold.

99. A method according to claim 98, wherein identifying the excursion further includes adding a pedestal to the excursion signal.

100. A method according to claim 98, wherein the excursion signal corresponds to a difference between the magnitude of the main signal and the threshold if the magnitude of the main signal exceeds the threshold.

101. A method according to claim 98, further including identifying a peak in the first signal, and wherein generating the excursion signal includes generating the excursion signal according to at least one of the magnitude and the occurrence of the peak.

102. A method according to claim 101, wherein the peak includes a set of three consecutive samples, wherein the middle sample has a higher magnitude than the first and third samples.

103. A method according to claim 98, further including adjusting the magnitude of the excursion signal according to the magnitude of a proximate peak to the peak.

104. A method according to claim 103, wherein the proximate peak is defined according to a selected range of samples from the peak.

105. A method according to claim 103, wherein adjusting the magnitude of the excursion signal includes adjusting the magnitude of the excursion signal according to the relative magnitudes of the proximate peak and the peak.

106. A communication system, including:
a transmitter, including:
an excursion signal generator configured to identify an excursion in a first signal exceeding a threshold and generate a corresponding excursion signal, wherein the first signal includes multiple channels having multiple subchannels, and the excursion signal includes corresponding channels and subchannels; and
an excursion reducer responsive to the excursion signal generator and configured to subtract the excursion signal from the first signal, including:
a filter system configured to filter selected frequencies in the excursion signal, wherein the filter system uses fast Fourier transforms;
a magnitude adjustment system configured to adjust magnitudes of the excursion signal subchannels according to magnitudes of the first signal subchannels; and
a sampling rate increase system configured to increase a sampling rate of the excursion signal, wherein the sampling rate increase system is configured to adjust the total number of samples in a set of samples to a power of two; and
a receiver configured to receive the first signal.

107. A communication system, including:
a transmitter, including:
an excursion signal generator configured to identify an excursion in a first signal exceeding a threshold and generate a corresponding excursion signal, wherein the first signal includes multiple channels having multiple subchannels, and the excursion signal includes corresponding channels and subchannels, wherein the excursion signal generator includes:
a peak identification system configured to identify a peak in the first signal, wherein the peak includes a set of three consecutive samples, wherein the middle sample has a higher magnitude than the first and third samples; and
a waveform generator responsive to the peak identification system and configured to generate the excursion signal according to at least one of the magnitude and the occurrence of the peak; and
an excursion reducer responsive to the excursion signal generator and configured to subtract the excursion signal from the first signal, including:
a filter system configured to filter selected frequencies in the excursion signal; and
a magnitude adjustment system configured to adjust magnitudes of the excursion signal subchannels according to magnitudes of the first signal subchannels; and
a receiver configured to receive the first signal.

108. A communication system, including:
a transmitter, including:
an excursion signal generator configured to identify an excursion in a first signal exceeding a threshold and generate a corresponding excursion signal, wherein the first signal includes multiple channels having multiple subchannels, and the excursion signal includes corresponding channels and subchannels, wherein the excursion signal generator includes:
a peak identification system configured to identify a peak in the first signal; and
a waveform generator responsive to the peak identification system and configured to generate the excursion signal according to at least one of the magnitude and the occurrence of the peak, wherein the waveform generator includes:
a peak response system configured to generate the excursion signal; and
a scaling system configured to adjust the magnitude of the excursion signal; and
an excursion reducer responsive to the excursion signal generator and configured to subtract the excursion signal from the first signal, including:
a filter system configured to filter selected frequencies in the excursion signal; and
a magnitude adjustment system configured to adjust magnitudes of the excursion signal subchannels according to magnitudes of the first signal subchannels; and
a receiver configured to receive the first signal.

109. A communication system according to claim 108, wherein the scaling system is configured to adjust the magnitude of the excursion signal according to the threshold, and wherein the threshold includes a selected threshold from a plurality of thresholds.

110. A communication system according to claim 108, wherein the scaling system is configured to adjust the magnitude of the excursion signal according to the magnitude of a proximate peak to the peak.

111. A communication system according to claim 110, wherein the proximate peak is defined according to a selected range of samples from the peak.

112. A communication system according to claim 110, wherein the scaling system is configured to adjust the magnitude of the excursion signal according to the relative magnitudes of the proximate peak and the peak.

113. A signal processing system, including:
an excursion signal generator configured to identify an excursion in a main signal, wherein the main signal and the excursion include multiple channels having subchannels; and
an excursion reducer configured to subtract the excursion from the main signal, including:
a filter system configured to filter selected frequencies from the excursion wherein the filter system uses fast Fourier transforms;
a magnitude adjustment system configured to adjust magnitudes of the excursion subchannels according to magnitudes of the main signal subchannels; and
a sampling rate Increase system configured to increase a sampling rate of the excursion signal wherein the sampling rate increase system is configured to adjust the total number of samples in a set of samples to a power of two.

114. A signal processing system, including:
an excursion signal generator configured to Identify an excursion in a main signal, wherein the main signal and the excursion Include multiple channels having subchannels, wherein the excursion signal generator includes:
a peak identification system configured to identify a peak in the first signal, wherein the peak includes a set of three consecutive samples, wherein the middle sample has a higher magnitude than the first and third samples; and a waveform generator responsive to the peak Identification system and configured to generate the excursion signal according to at least one of the magnitude and the occurrence of the peak; and an excursion reducer configured to subtract the excursion from the main signal, including:

a filter system configured to filter selected frequencies from the excursion; and a magnitude adjustment system configured to adjust magnitudes of the excursion subchannels according to magnitudes of the main signal subchannels.

115. A signal processing system, including:

an excursion signal generator configured to identify an excursion in a main signal, wherein the main signal and the excursion include multiple channels having subchannels, wherein the excursion signal generator includes:

a peak identification system configured to identify a peak in the first signal; and a waveform generator responsive to the peak identification system and configured to generate the excursion signal according to at least one of the magnitude and the occurrence of the peak, wherein the waveform generator includes:

a peak response system configured to generate the excursion signal; and a scaling system configured to adjust the magnitude of the excursion signal; and an excursion reducer configured to subtract the excursion from the main signal, including:

a filter system configured to filter selected frequencies from the excursion; and a magnitude adjustment system configured to adjust magnitudes of the excursion subchannels according to magnitudes of the main signal subchannels.

116. A signal processing system according to claim 115, wherein the scaling system is configured to adjust the magnitude of the excursion signal according to the threshold, and wherein the threshold includes a selected threshold from a plurality of thresholds.

117. A signal processing system according to claim 115, wherein the scaling system is configured to adjust the magnitude of the excursion signal according to the magnitude of a proximate peak to the peak.

118. A signal processing system according to claim 117, wherein the proximate peak is defined according to a selected range of samples from the peak.

119. A signal processing system according to claim 117, wherein the scaling system is configured to adjust the magnitude of the excursion signal according to the relative magnitudes of the proximate peak and the peak.

120. A transmitter system, including:

an excursion identifier configured to identify an excursion in a main signal, wherein the excursion and the main signal include multiple channels having subchannels;

an excursion reducer configured to subtract the excursion from the main signal, including:

a filter system configured to filter selected frequencies from the excursion, wherein the filter system uses fast Fourier transforms;

a magnitude adjustment system configured to adjust magnitudes of the excursion signal subchannels according to magnitudes of the main signal subchannels; and a sampling rate increase system configured to increase a sampling rate of the excursion signal, wherein the sampling rate increase system is configured to adjust the total number of samples in a set of samples to a power of two.

121. A transmitter system, including:

an excursion identifier configured to identify an excursion in a main signal, wherein the excursion and the main signal include multiple channels having subchannels, wherein the excursion identifier includes:

a peak identification system configured to identify a peak in the main signal, wherein the peak includes a set of three consecutive samples, wherein the middle sample has a higher magnitude than the first and third samples; and a waveform generator responsive to the peak identification system and configured to generate an excursion signal according to at least one of the magnitude and the occurrence of the peak; and an excursion reducer configured to subtract the excursion from the main signal, including:

a filter system configured to filter selected frequencies from the excursion; and a magnitude adjustment system configured to adjust magnitudes of the excursion signal subchannels according to magnitudes of the main signal subchannels.

122. A transmitter system, including:

an excursion identifier configured to identify an excursion in a main signal, wherein the excursion and the main signal include multiple channels having subchannels, wherein the excursion identifier includes:

a peak identification system configured to identify a peak in the first signal; and a waveform generator responsive to the peak identification system and configured to generate an excursion signal according to at least one of the magnitude and the occurrence of the peak, wherein the waveform generator includes:

a peak response system configured to generate the excursion signal; and a scaling system configured to adjust the magnitude of the excursion signal; and an excursion reducer configured to subtract the excursion from the main signal, including:

a filter system configured to filter selected frequencies from the excursion; and a magnitude adjustment system configured to adjust magnitudes of the excursion signal subchannels according to magnitudes of the main signal subchannels.

123. A transmitter system according to claim 122, wherein the scaling system is configured to adjust the magnitude of the excursion signal according to the threshold, and wherein the threshold includes a selected threshold from a plurality of thresholds.

124. A transmitter system according to claim 122, wherein the scaling system is configured to adjust the magnitude of the excursion signal according to the magnitude of a proximate peak to the peak.

125. A transmitter system according to claim 124, wherein the proximate peak is defined according to a selected range of samples from the peak.

126. A transmitter system according to claim 124, wherein the scaling system is configured to adjust the magnitude of the excursion signal according to the relative magnitudes of the proximate peak and the peak.

127. A method for processing signals, including:
identifying an excursion in a main signal, wherein the excursion and the main signal include multiple channels having subchannels;
filtering selected frequencies in the excursion using fast Fourier transforms;
adjusting magnitudes of the excursion signal subchannels according to magnitudes of the main signal subchannels; and
subtracting the excursion from the main signal;
wherein the method includes increasing a sampling rate of the excursion including increasing the sampling rate by adjusting the total number of samples in a set of samples to a power of two.

* * * * *